US010901312B2

(12) United States Patent
Basler et al.

(10) Patent No.: US 10,901,312 B2
(45) Date of Patent: Jan. 26, 2021

(54) MOVEABLY-COUPLED SCREEN ACTUATORS

(71) Applicant: Dolby Laboratories Licensing Corporation, San Francisco, CA (US)

(72) Inventors: Brad Basler, San Mateo, CA (US); Trevor Davies, Walnut Creek, CA (US); Douglas J. Gorny, Pacifica, CA (US); Wilson Allen, Mill Valley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/583,120

(22) Filed: Sep. 25, 2019

(65) Prior Publication Data
US 2020/0018988 A1    Jan. 16, 2020

Related U.S. Application Data

(63) Continuation of application No. 15/892,345, filed on Feb. 8, 2018, now Pat. No. 10,429,663, which is a continuation of application No. 15/109,791, filed as application No. PCT/US2015/010064 on Jan. 2, 2015, now Pat. No. 9,921,416.

(60) Provisional application No. 61/923,256, filed on Jan. 3, 2014, provisional application No. 61/982,530, filed on Apr. 22, 2014, provisional application No. 62/096,343, filed on Dec. 23, 2014.

(51) Int. Cl.
*G03B 21/56* (2006.01)
*G02B 27/48* (2006.01)

(52) U.S. Cl.
CPC ........... *G03B 21/562* (2013.01); *G02B 27/48* (2013.01)

(58) Field of Classification Search
CPC .............................. G03B 21/562; G02B 27/48
USPC ......................................................... 359/446
See application file for complete search history.

(56) References Cited

U.S. PATENT DOCUMENTS

| 4,143,943 | A | 3/1979 | Rawson |
| 4,317,618 | A | 3/1982 | Murakoshi |
| 5,272,473 | A | 12/1993 | Thompson |
| 6,278,546 | B1 | 8/2001 | Dubin |
| 6,317,169 | B1 | 11/2001 | Smith |

(Continued)

FOREIGN PATENT DOCUMENTS

| CN | 101097396 | 1/2008 |
| CN | 101976013 | 2/2011 |

(Continued)

*Primary Examiner* — Christopher E Mahoney

(57) ABSTRACT

A speckle damping system for dampening speckle on a projection screen for a projection display system employing coherent or partially coherent light sources (e.g., lasers, LEDs) are disclosed. In one embodiment, a rotatably coupled system is disclosed, comprising: a set of actuators; a set of rotatably coupled mounts, each of said set of rotatably coupled mount capable of mounting at least one said actuator; and wherein said at least one actuator mounted on said rotatably coupled mount is in moveable mechanical communication with said projection screen. In another embodiment, a linearly coupled system is disclosed comprising: a set of actuators; a set of linearly coupled mounts, each of said set of linearly coupled mount capable of mounting at least one said actuator; and wherein said at least one actuator mounted on said linearly coupled mount is in moveable mechanical communication with said projection screen.

18 Claims, 19 Drawing Sheets

(56) References Cited

U.S. PATENT DOCUMENTS

| | | |
|---|---|---|
| 6,942,959 B2 | 9/2005 | Dubin |
| 7,715,084 B2 | 5/2010 | Tan |
| 7,796,330 B2 | 9/2010 | Sandburg |
| 7,816,637 B2 | 10/2010 | Michimori |
| 7,880,965 B2 | 2/2011 | Michimori |
| 8,085,467 B1 | 12/2011 | Silverstein |
| 8,366,281 B2 | 2/2013 | Silverstein |
| 8,425,056 B2 | 4/2013 | Sumiyama |
| 8,444,271 B2 | 5/2013 | Dunphy |
| 8,469,519 B2 | 6/2013 | Marcus |
| 8,585,206 B2 | 11/2013 | Gollier |
| 9,921,416 B2 | 3/2018 | Basler |
| 2005/0002102 A1 | 1/2005 | Wegmann |
| 2006/0238743 A1 | 10/2006 | Lizotte |
| 2008/0192501 A1 | 8/2008 | Bartlett |
| 2008/0285778 A1 | 11/2008 | Kuroda |
| 2009/0034037 A1 | 2/2009 | Khan |
| 2010/0053474 A1 | 3/2010 | Kamei |
| 2010/0097698 A1 | 4/2010 | Kinoshita |
| 2010/0312106 A9 | 12/2010 | Blalock |
| 2011/0194082 A1 | 8/2011 | Desai |
| 2012/0019918 A1 | 1/2012 | Dunphy |
| 2012/0206782 A1 | 8/2012 | Chan |
| 2012/0206784 A1 | 8/2012 | Chan |
| 2013/0010356 A1 | 1/2013 | Curtis |
| 2013/0063706 A1 | 3/2013 | Kilcher |
| 2013/0176407 A1 | 7/2013 | Curtis |
| 2013/0242365 A1 | 9/2013 | Koyanagi |
| 2014/0362437 A1 | 12/2014 | McKnight |
| 2016/0103388 A1 | 4/2016 | Herati |

FOREIGN PATENT DOCUMENTS

| | | |
|---|---|---|
| CN | 201859300 | 6/2011 |
| CN | 102141687 | 8/2011 |
| CN | 103246078 | 8/2013 |
| DE | 2016183 | 10/1970 |
| DE | 2017222 | 10/1971 |
| DE | 202004020615 | 9/2005 |
| JP | 495256 | 2/1974 |
| JP | 495257 | 2/1974 |
| JP | 5565940 | 5/1980 |
| JP | 2002090881 | 3/2002 |
| JP | 2002281416 | 9/2002 |
| JP | 2007286349 | 11/2007 |
| JP | 2007328002 | 12/2007 |
| JP | 2008191533 | 8/2008 |
| JP | 2009128666 | 6/2009 |
| JP | 2009134231 | 6/2009 |
| JP | 4288785 | 7/2009 |
| JP | 4378865 | 12/2009 |
| JP | 4605032 | 1/2011 |
| KR | 100852670 | 8/2008 |

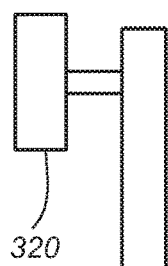
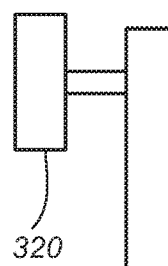
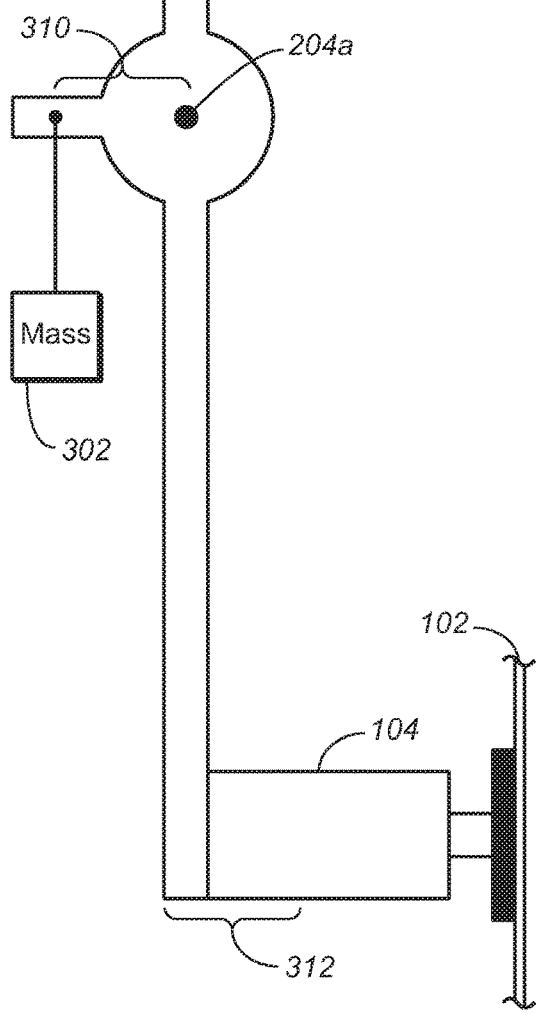
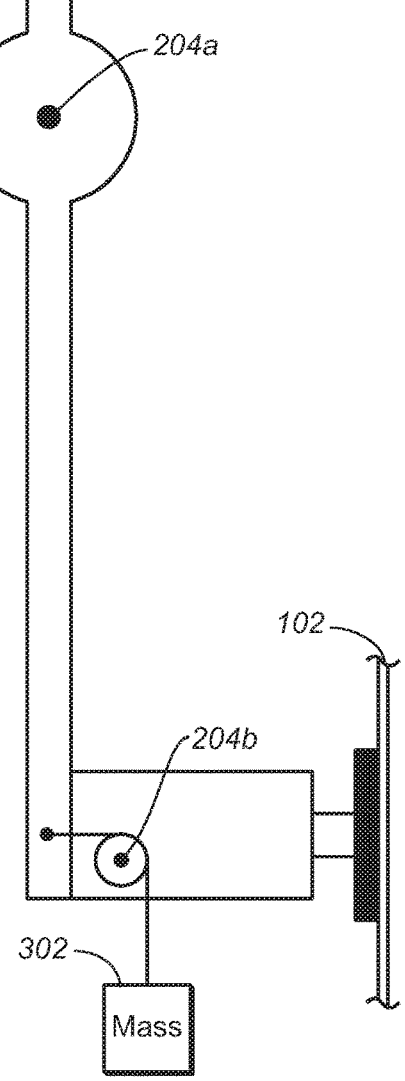
FIG. 3C
FIG. 3D

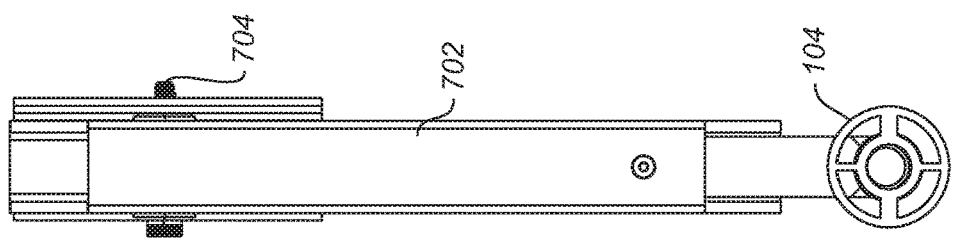
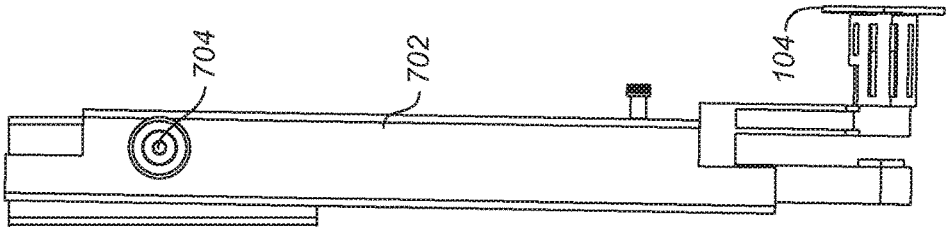
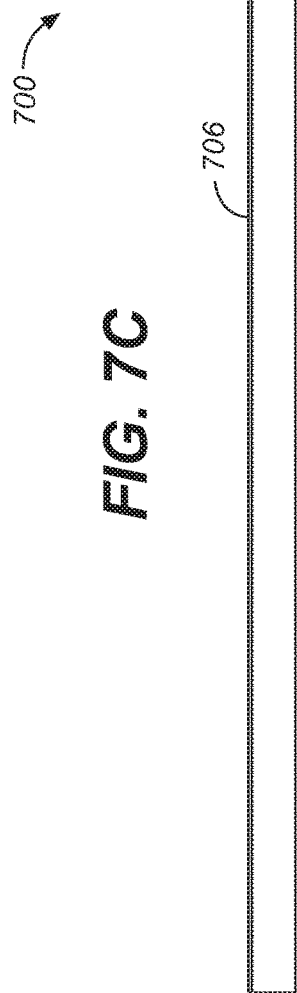
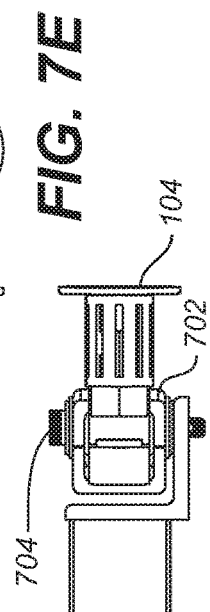
FIG. 7C
FIG. 7D
FIG. 7E

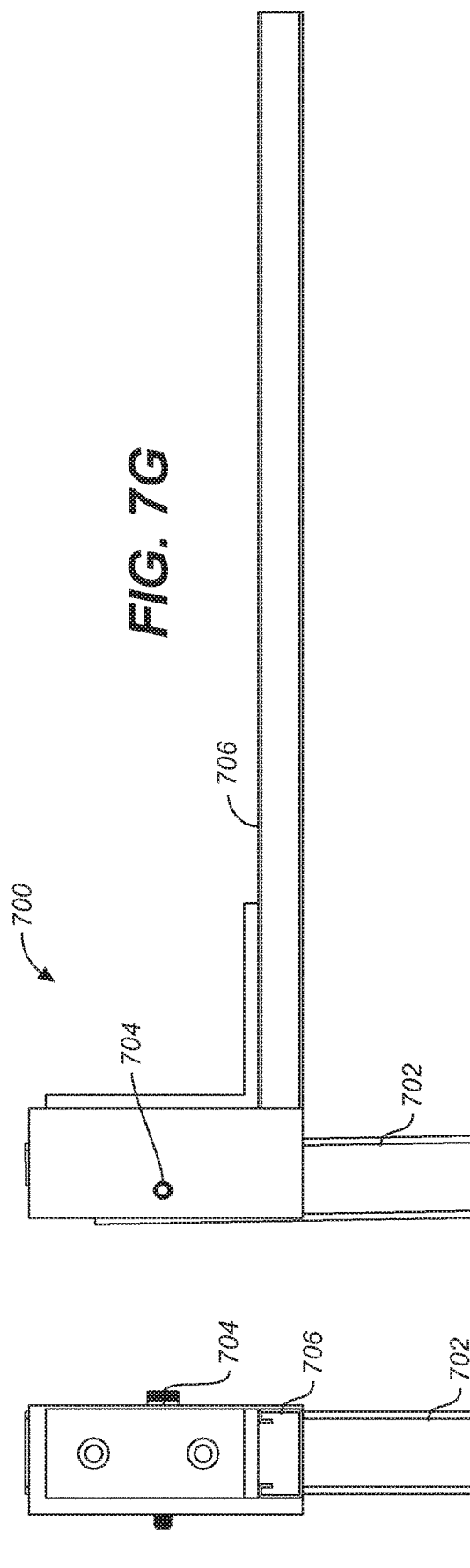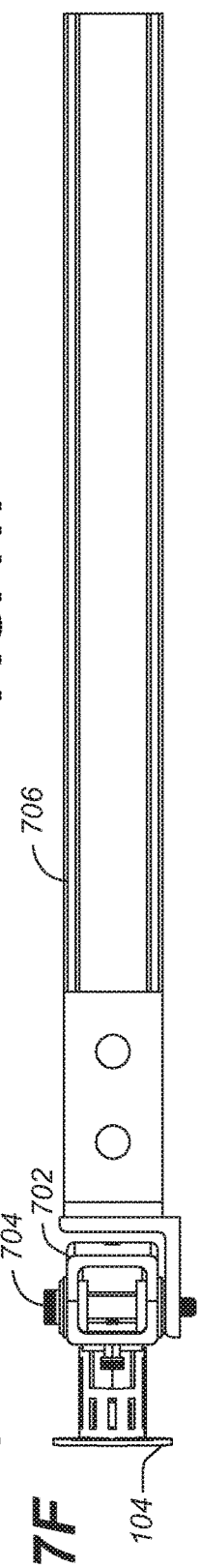

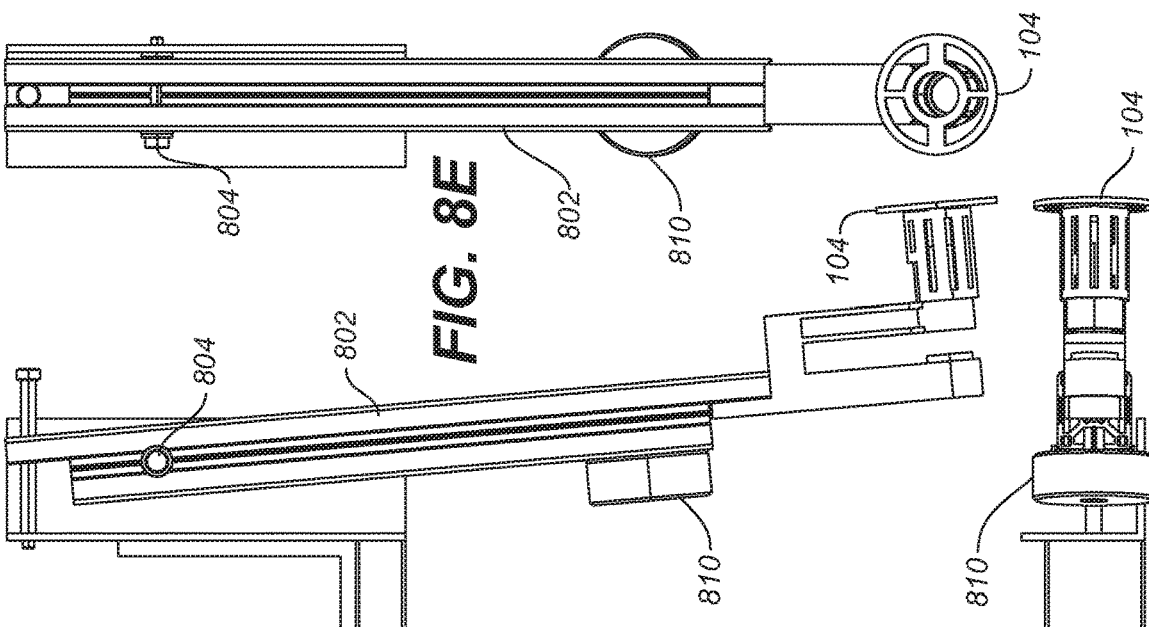
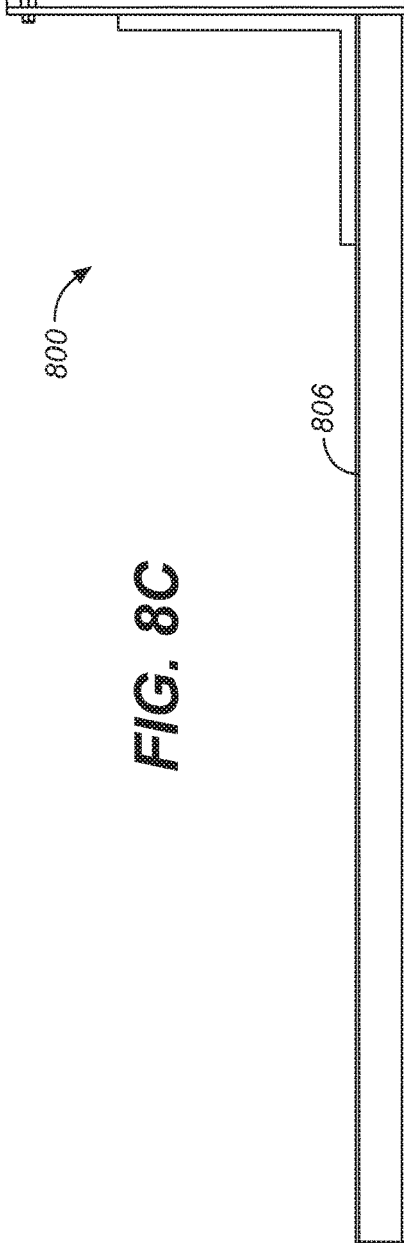
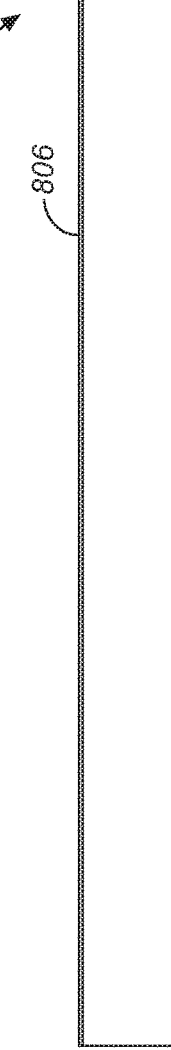
FIG. 8C
FIG. 8D
FIG. 8E

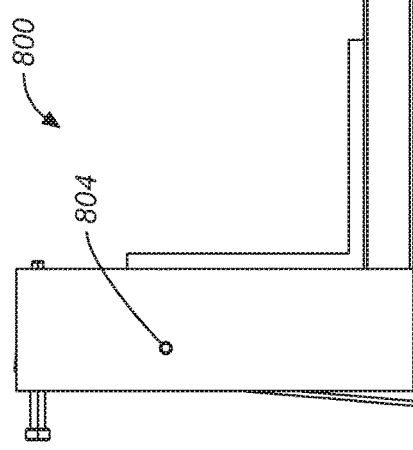
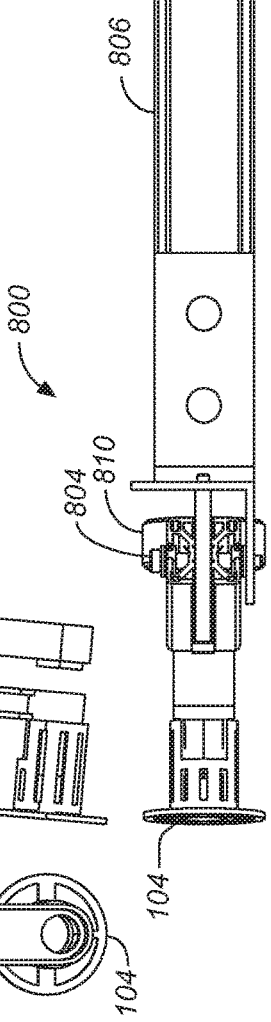
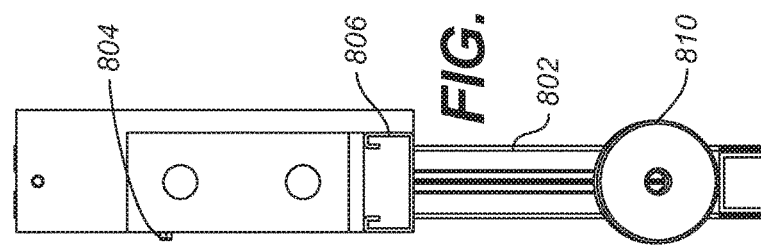

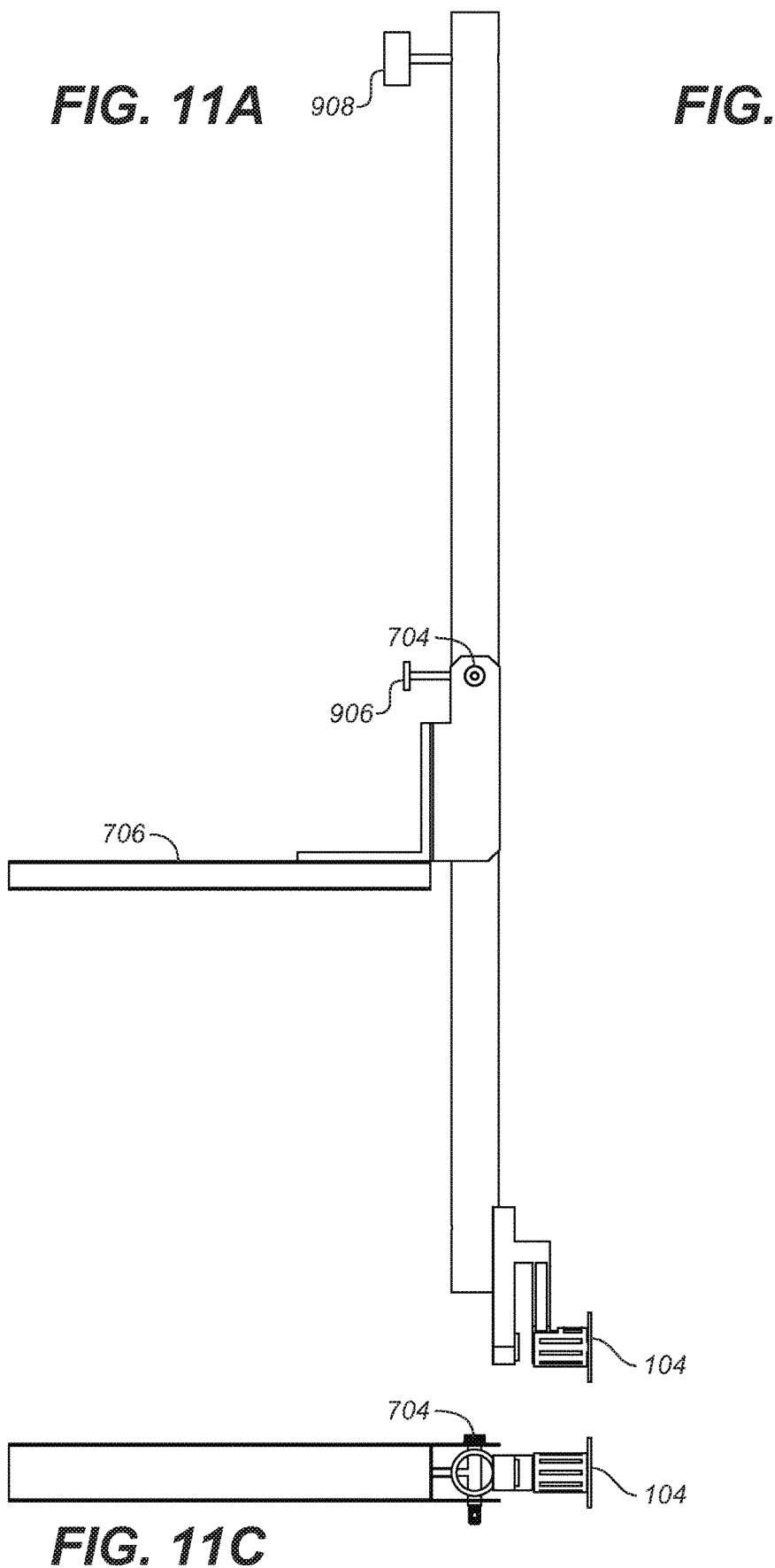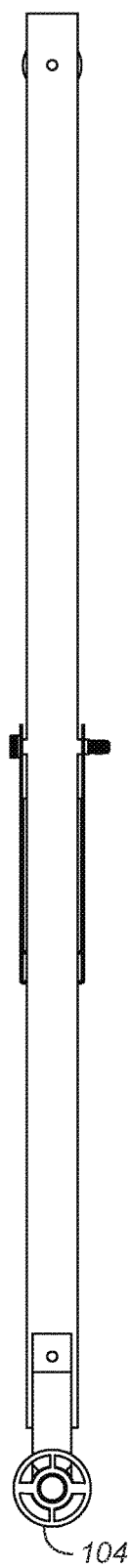
FIG. 11A
FIG. 11B
FIG. 11C

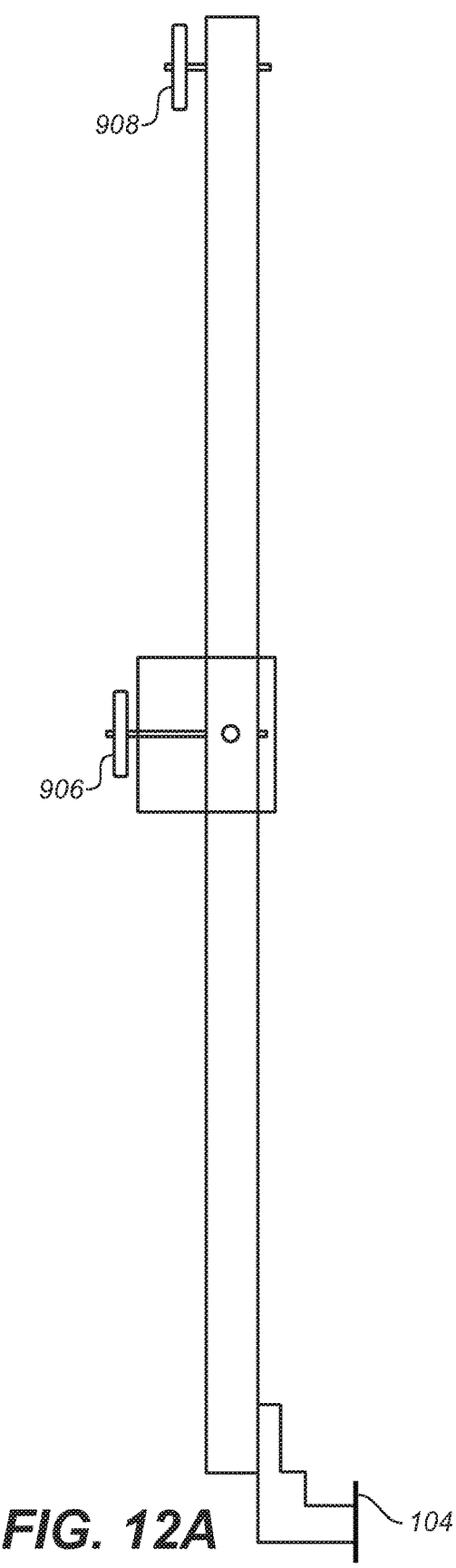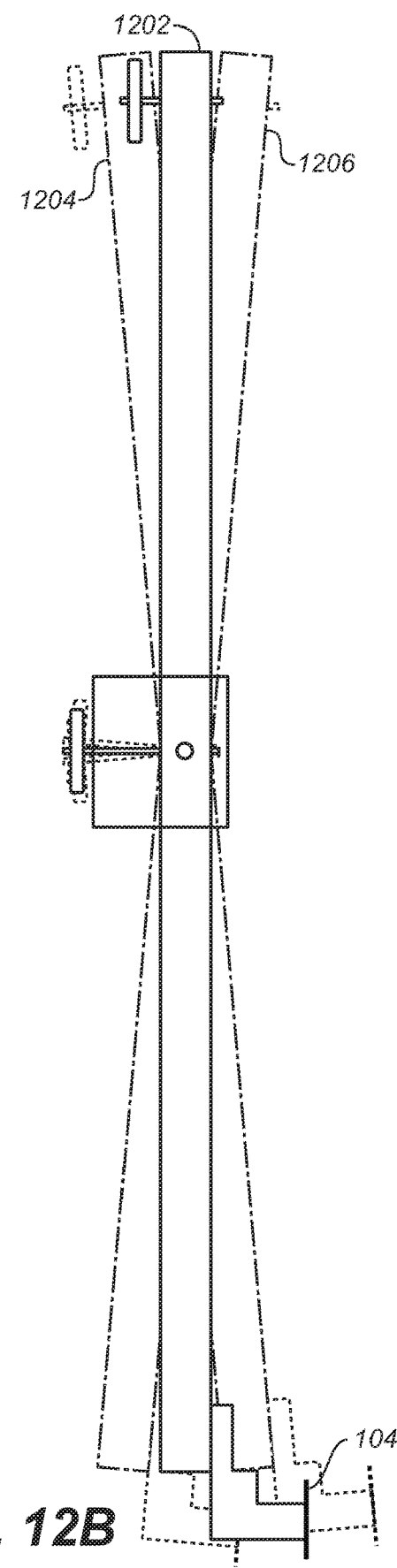
FIG. 12A
FIG. 12B

MOVEABLY-COUPLED SCREEN ACTUATORS

CROSS-REFERENCE TO RELATED APPLICATIONS

This application is a continuation of U.S. patent application Ser. No. 15/892,345 filed on Feb. 8, 2018; which is a continuation of U.S. patent application Ser. No. 15/109,791 filed on Jul. 5, 2016, now U.S. Pat. No. 9,921,416 issued on Mar. 20, 2018; which claims benefit to International Patent Application No. PCT/US2015/010064 filed on Jan. 2, 2015, which claims the benefit of priority to U.S. Provisional Patent Application No. 61/923,256 filed on Jan. 3, 2014; U.S. Provisional Patent Application No. 61/982,530 filed on Apr. 22, 2014; and U.S. Provisional Patent Application No. 62/096,343 filed on Dec. 23, 2014, all entireties of which are incorporated herein by reference.

TECHNICAL FIELD OF THE INVENTION

The present invention relates to projector displays systems and, more particularly, to systems and methods of reducing and/or dampening speckle on a projection screen.

BACKGROUND OF THE INVENTION

In projector systems that use either coherent light or partially coherent light sources (e.g., lasers, LEDs or the like), an issue of speckle may occur. Speckle arises due to the interference of the coherent or partially coherent light that reflects and/or scatters from a projector screen. Speckle is typically an undesirable visible artifact that projector system designers seek to eliminate and/or abate.

It is known in the art that inducing vibrations on the projector screen (e.g., in particular, in the direction of the viewers, or z-axis (where x-, y-axis substantially describe the plane of the screen) tend to reduce and/or eliminate such speckle.

Several solutions are noted in the art—for example:
(1) United States Patent Application 20120206784 to CHAN et al., published on Aug. 16, 2012 and entitled "DEVICE FOR REDUCING SPECKLE EFFECT IN A DISPLAY SYSTEM";
(2) United States Patent Application 20110194082 to Desai, published on Aug. 11, 2011 and entitled "MICROELECTROMECHANICAL SYSTEM WITH REDUCED SPECKLE CONTRAST";
(3) United States Patent Application 20090034037 to Khan et al., published on Feb. 5, 2009 and entitled "METHOD AND SYSTEM FOR REDUCING SPECKLE BY VIBRATING A LINE GENERATING ELEMENT";
(4) United States Patent Application 20130010356 to Curtis et al., published on Jan. 10, 2013 and entitled "SPECKLE REDUCTION USING SCREEN VIBRATION TECHNIQUES AND APPARATUS";
(5) United States Patent Application 20060238743 to Lizotte et al., published on Oct. 26, 2006 and entitled "SPECKLE REDUCTION OPTICAL MOUNT DEVICE"
all of which are hereby incorporated by reference in their entirety.

SUMMARY OF THE INVENTION

A speckle damping system for dampening speckle on a projection screen for a projection display system employing coherent or partially coherent light sources (e.g., lasers, LEDs) are disclosed. In one embodiment, a rotatably coupled system is disclosed, comprising: a set of actuators; a set of rotatably coupled mounts, each of said set of rotatably coupled mount capable of mounting at least one said actuator; and wherein said at least one actuator mounted on said rotatably coupled mount is in moveable mechanical communication with said projection screen. In another embodiment, a linearly coupled system is disclosed comprising: a set of actuators; a set of linearly coupled mounts, each of said set of linearly coupled mount capable of mounting at least one said actuator; and wherein said at least one actuator mounted on said linearly coupled mount is in moveable mechanical communication with said projection screen.

In another embodiment, both rotatably coupled systems and linearly coupled systems may further comprise a magnetic coupling system, comprising: a first magnetic element, said first magnetic element affixed to said projector screen; a second magnetic element, said second magnetic element affixed to substantially proximal to said actuator; and said second magnetic element being substantially proximal to said first magnetic element such that the magnetic force between said first and said second magnetic elements capable of substantially maintaining a desired mechanical communication of said actuator with said projection screen.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 3C and 3D depict two additional alternative embodiments of a rotatably coupled actuator system—as shown in FIGS. 3A and 3B and additionally comprising a counterbalance weight.

FIGS. 7A through 7H are a set of various perspective drawings of one pendulum embodiment.

FIGS. 8A through 8H are a set of various perspective drawings of another pendulum embodiment.

FIGS. 11A through 11C depict several other different views of one particular embodiment of a pendulum screen shaker comprising a counterweight.

FIGS. 12A and 12B depict one embodiment of a pendulum screen shaker comprising a counterweight at rest and with relative motion between positions.

DETAILED DESCRIPTION

Figure 1A:
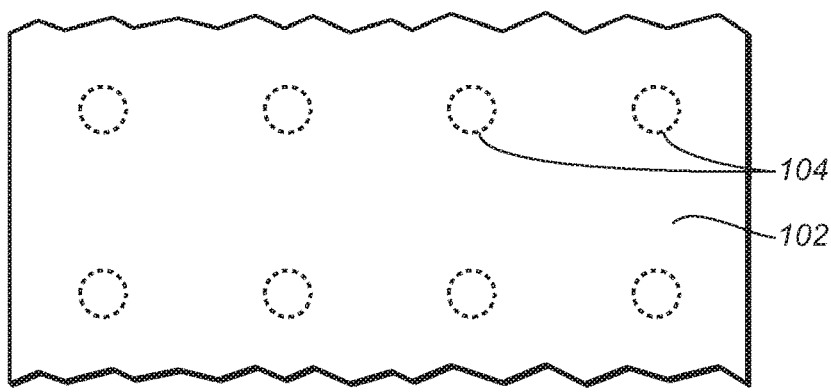
FIG. 1A is front view of a conventional projector screen with mechanical actuators coupled to the screen on the back of the screen.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As utilized herein, terms "component," "system," "interface," "controller" and the like are intended to refer to a computer-related entity, either hardware, software (e.g., in execution), and/or firmware. For example, any of these terms can be a process running on a processor, a processor, an object, an executable, a program, and/or a computer. By way of illustration, both an application running on a server and the server can be a component and/or controller. One or more components/controllers can reside within a process and a component/controller can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Introduction

The current state of the art for speckle reduction of laser-based projected images is to vibrate the projection screen very slightly in the direction of the projected light, along the line of sight of a viewer. The most effective implementation of this technique is to install an array of mechanical shakers/actuators (e.g., "Voice Coils", ultrasound transducers, solenoid, shaker and the like) mounted behind the projection screen.

Such references employing such voice coils are disclosed in:

(1) United States Patent Application 20120019918 to Dunphy et al., published on Jan. 26, 2012 and entitled "SYSTEM AND METHOD FOR REDUCING VISIBLE SPECKLE IN A PROJECTION VISUAL DISPLAY SYSTEM"; and (2) United States Patent Application 20100312106 to Blalock et al., published Dec. 9, 2010 and entitled "ULTRASOUND IMAGING BEAM-FORMER APPARATUS AND METHOD"

and herein incorporated by reference in its entirety.

One possible drawback to using mechanical actuators/shakers (of any type or kind—such as voice coils, ultrasound actuators or the like) is that it may be desired to have accurate placement of the actuator very closely to the back of the screen, but not so closely that the actuator pushes against the screen. In such a case, the outline of the actuator may produce a "dimple" or an otherwise impression of itself, which may be easily visible and distracting.

Figure 1B:
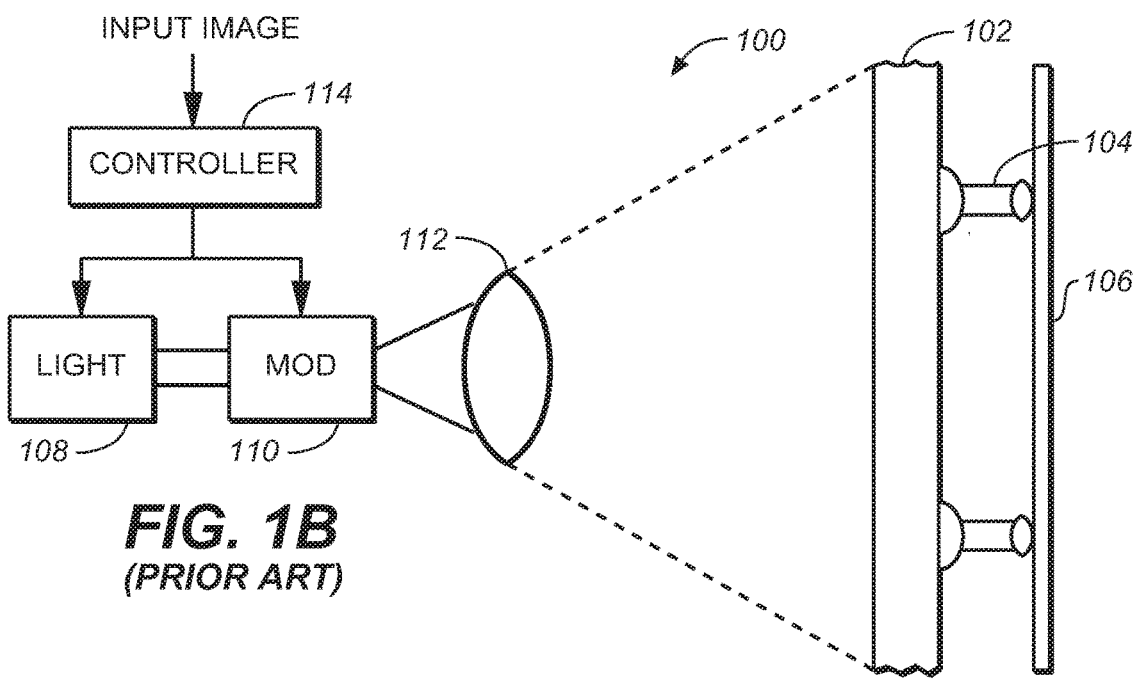
FIG. 1B is a side view of a conventional projector screen with mechanical actuators coupled to the screen in a substantially fixed manner.

FIG. 1A shows a front view of a projector screen 102 with an array of conventional mechanical actuators 104 in physical proximity with the projector screen from behind the screen. FIG. 1B is a cross-sectional view of the conventional array of actuators 104 in contact with screen 102. Actuators 104 may be held in position by support 106—e.g., typically in a fixed position. A projector system is depicted in schematic format in FIG. 1B. Projector system 100 may comprise a light source 108 (typically, coherent or partially coherent sources, like lasers or LEDs), a modulator 110 which may receive light from source 108 and create a modulated light source to illuminate projector optics 112 to form a final image on screen 102.

Although the laser and/or partially coherent projector system may be of any type or construction known, in some embodiments, the laser projection system may comprise, for example, a dual modulation DMD projection system. The dual modulation system may comprise a reduced initial amount of speckle operation of the screen shakers compared to commercial single modulation (e.g., 3 chip DLP) laser projectors, and which the reduced initial amount of speckle is further reduced by operation of the screen shakers.

The laser projection system may comprise a 3 chip DLP projection system. The laser projection system comprises a 3 chip DLP six-primary laser projection system. The laser projection system comprises a 6 chip DLP six primary projection system. The laser projection system produces images on the screen having a contrast ratio in excess of 99,999:1.

The laser projection system produces images on the screen having a dynamic contrast ratio between scenes in excess of 999,999:1. The laser projection system produces images on the screen having a single frame contrast ratio of at least 100,000:1 and a dynamic intra frame contrast ratio in excess of 1,000,000:1.

As noted, if the contact between the actuators 104 and screen 102 is not substantially precise, then an outline of the actuators 104 may become visible upon the screen and adversely affect the speckle reduction as desired. In fact, if the screen 102 is induced to move at all (e.g., by change in air pressure due to air conditioning or, possibly from a door to the theater opening and/or closing, or from the expansion and/or contraction of the screen with temperature), then the actuators 104 may also become visible or they may lose contact with the screen resulting in the speckle reduction being abated. It may be desirable that the force of the actuator against the screen is maintained substantially constantly over the range of movement of the screen.

In many embodiments, it may be desirable to induce vibrations (e.g., from actuators) that are more than pure Z-axis vibration (i.e., vibrations along the viewer's line of sight to the screen). Pure Z-axis may not be sufficient in many case to mitigate speckle. In many cases, the interference patterns may be quite deep (e.g. if the viewer perceives speckle and moves his/her head closer and farther from the screen without moving side to side or up and down, the speckle pattern may tend to change very slowly). Similarly, moving the screen in the Z axis may not change the interference pattern significantly. Thus, vibrating the screen in the Z axis (e.g., where the intention is for the eye to integrate over the variations in interference patterns) may not be effective. Instead, speckle may be better reduced by creating waves on the screen.

So, in the case of using stationary actuators (e.g., as in FIGS. 1A and 1B), if the actuators are too close to the screen, the viewers may perceive two problems: (i) dimples (made by the contact of the actuator on the screen) and (ii) speckle in the dimples only (because in these areas there tend to be only Z-axis movement). For the case where the actuators are too far from the screen, they don't even touch the screen, there is no vibration and there is no speckle reduction at all.

One Embodiment

Figure 2A:
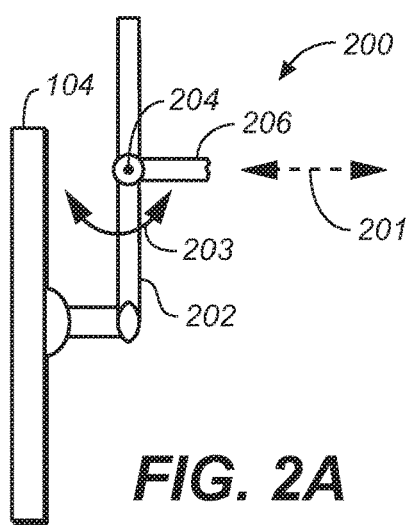
FIGS. 2A and 2B depict a mechanical actuator that is rotatably coupled to a support structure that tends to provide proper coupling between the actuator and the screen—that have a substantially flat engaging surface and a substantially curved engaging surface, respectively.

FIG. 2A depicts one embodiment of an actuator support structure 200. Structure 200 may be a rotatably coupled mount, where the mount is capable of mounting or attaching an actuator 104 on a first support portion 202. Any suitable means of mounting and/or attaching the actuator to the first support portion may be suitable—e.g., mechanical clipping, affixing, gluing, soldering or the like. First support beam 202 may be, in turn, rotatably attached to a second support portion 206—e.g., possibly by a pivot 204. Second support portion 206 may be fixedly or adjustably set, affixed and/or supported in place to any other suitable structure and/or position in the theater (not shown)—e.g., in order to provide a substantially suitable stable frame for the first support portion. It will be appreciated that, although only one actuator is shown on a support structure, it is possible to construct a set and/or an array of such support structure(s) that support the entire set of actuators for a screen—either individually, a subset or the entire set of actuators. The present application is not limited to merely one support structure for one actuator; but the scope of the present application encompasses all such support structures.

In one embodiment, second support portion 206 may be (optionally) adjustably set—e.g., for example, as shown by dotted line 201. This adjustable setting may be preferentially set by theater personnel—e.g., to adjust the pressure actuator 104 makes upon screen 102 and/or to adjust the position of the actuator in the middle range. In one embodiment, an adjustment weight, as described herein, may be set to adjust the pressure suitably so that the actuator 104 makes desirable contact with the screen (e.g. to abate and/or dampen speckle); but not so much as to make a visibly noticeable dimple in the screen to the viewers (and, possibly, abate and/or dampen speckle reduction).

Once a pivot point 204 is set, first support portion 202 may be rotatable about the pivot—e.g., for example as shown by arc 203. Rotatable movement of the actuator 104 may be desirable in certain situations. For example, if the screen has some motion (e.g., as might be induced by changes in air pressure, ground movements or the like), then the actuator may be allowed to move in response to the screen and continue to in contact with the screen and thus, provide continued speckle reduction. In addition, movable actuator may be able to dampen the motion of the screen itself.

Figure 2B:
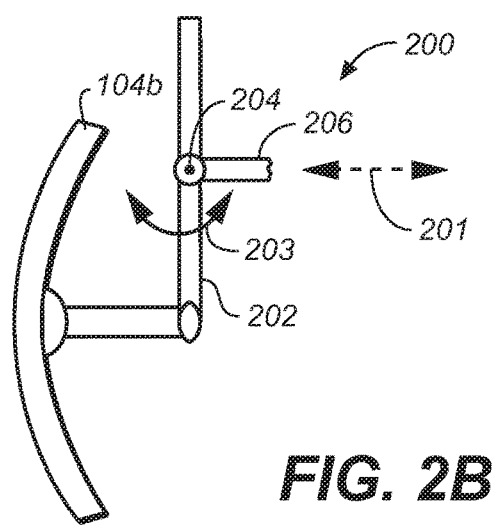

In FIG. 2A, it may be seen that actuator 104 may have a substantially flat surface for engaging with the screen. However, in FIG. 2B, actuator 104b may have some form of curved feature and/or surface in which to engage with the screen. Such a curved surface may be desirable if the displacements of the actuator with respect to the screen cause a sharp edge of the actuator to become visible to the viewer and/or have an undesirable effect on the dampening of the speckle. It may be understood that the curvature of the actuator may be circular or spherical (or a portion thereof), bent, bowed, arched and/or arcuate—in such a manner as to provide no (or at least less) detectable edges of the actuator when there is relative movement of the screen with the actuator.

Such a curved actuator may be desirable in operation, if the actuator is not substantially parallel to the screen (e.g. due to misalignment of the mount or large screen displacements). In such a case, one edge of the flat actuator may press harder against the screen surface which in extreme cases may cause an arc-shaped imprint on the screen. Thus, a curved actuator (for example, one where the actuator surface may be a section of a larger sphere) would tend to present a consistent contact surface over a range or rotations. The curvature radius may be between a few inches to 'd' the length of the pendulum. In addition, as noted above, pure Z-axis vibration may not reduce speckle—and in particular if speckle is still apparent within the contact area of a flat actuator. The curved actuator would tend to reduce the area that moves simply in the Z axis and improve the speckle reduction in the contact area.

In many embodiments, it may be desirable to suitably construct the length of the first support/pendulum portion for several advantages, such as:

(1) If the pendulum length is long with respect to the range of motion of the screen (e.g., that the actuator had to follow) then the variation in angle is small and that reduces any asymmetrical imprint of the skewed actuator on the screen. If the actuator is small then, for any angle, the effect of the asymmetrical imprint of the actuator is reduced. A larger ratio of pendulum length to actuator size reduces the imprint but not the angle. Angular variations may tend to cause an edge of the actuator to become visible.

(2) For the pendulum support schemes, the moment of force varies with large angles of the pendulum and hence the force applied through the actuator to the screen varies with angle. If the pendulum is long, then it may allow for significant Z-axis movement without significant change of angle of the pendulum and hence may tend to maintain an approximately constant force on the screen.

(3) The pendulum schemes may have a natural frequency (e.g., if the screen was to be removed and the actuator pushed, it would tend to oscillate at its natural frequency). It may be desirable that the natural frequency be designed to be different from the frequency of the actuator vibration otherwise the pendulum may vibrate instead of the screen. A long pendulum may tend to allow for a low natural frequency.

Other Embodiments

Figure 3B:
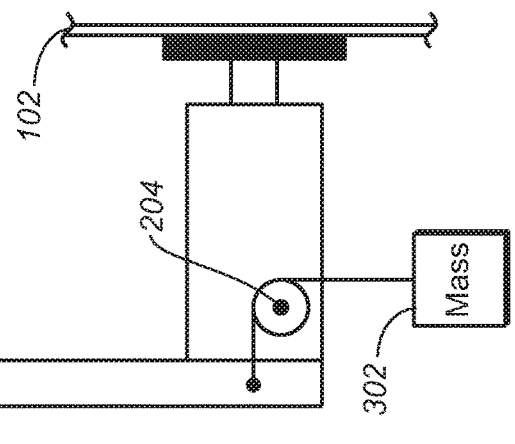
FIGS. 3A and 3B depict two alternative embodiments of a rotatably coupled actuator system.
Figure 3A:
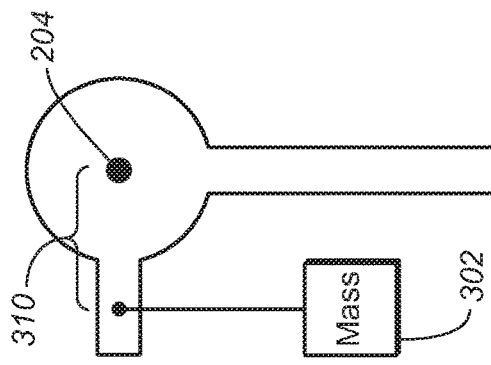

FIGS. 3A and 3B depict alternative embodiments of an actuator support structure. As may be seen, an additional mass may be placed advantageously on the support structure. In these embodiments, it may be possible to adjust the force with the additional mass (e.g., as placed on either the first support portion or the second support portion) on the screen as desired for the screen material. In both FIGS. 3A and 3B, the force may be adjusted by adjusting the mass shown.

For example, the mass may be adjusted as follows:
(1) In FIG. 3A—Let distance 310 ($I_1$) denote the distance from the pivot to the attachment point of the mass, and distance 312 ($I_2$) denote the distance from the pivot to the center of mass of the actuator and let Pi be the length of the pendulum. The force on the screen would be:

$$F = m*g*\left(\frac{l1}{P_1}\right) - m_{cg}*g*\left(\frac{l2}{P_1}\right)$$

where g is the acceleration due to gravity and m is the mass of the attached mass and $m_{cg}$ is the mass of the actuator at the center of gravity of the actuator.
(2) In FIG. 3B—The force on the screen would be:

$F=m*g$

FIGS. 3C and 3D are additional embodiments of actuator support structures (substantially following the embodiments of FIGS. 3A and 3B) in which the support structure is extended past pivot points 204a and a counterweight 320 is supplied to advantageously provide desirable balance of the actuator support structure.

Figure 3E:
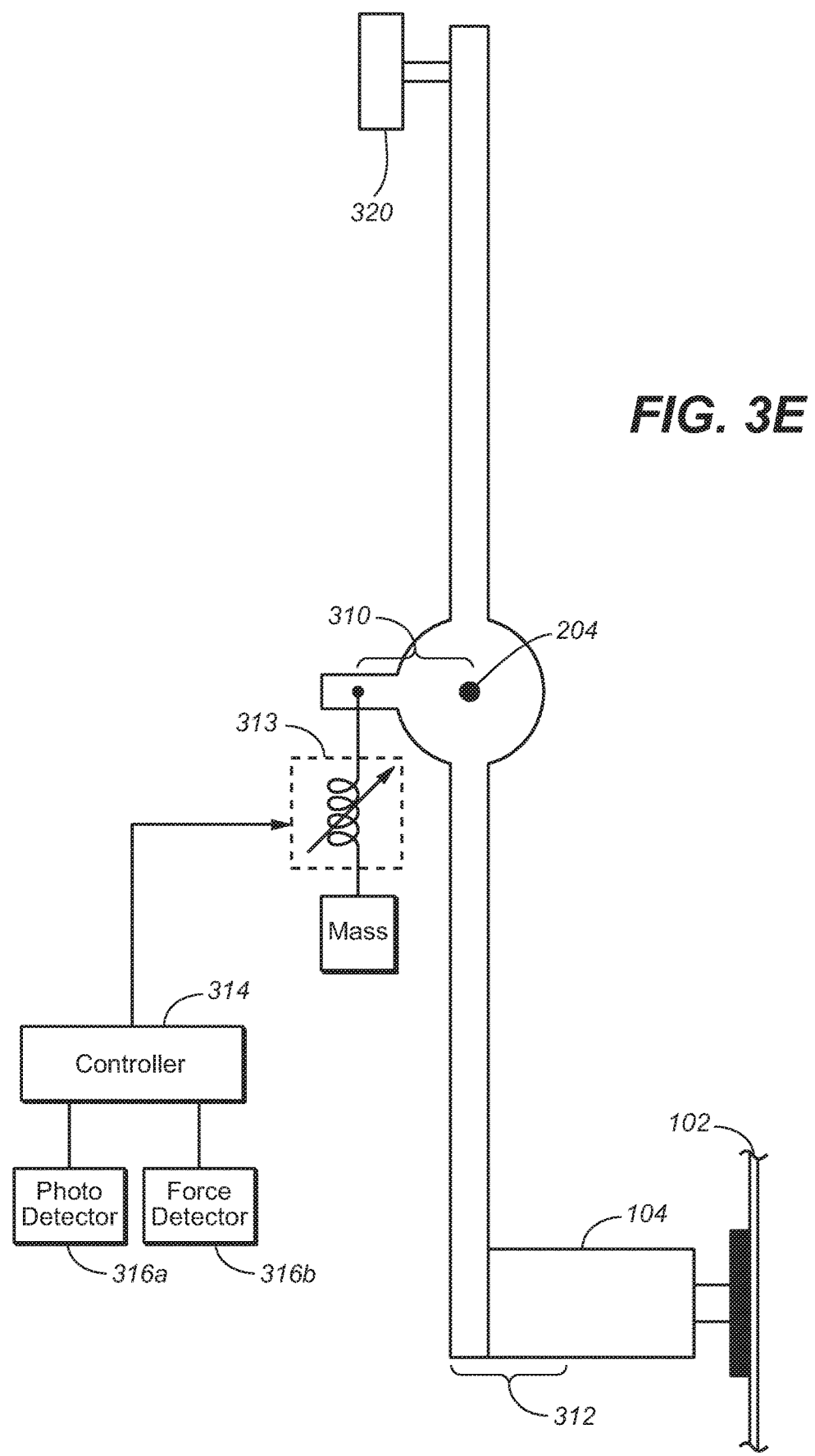
FIG. 3E depicts one additional alternative embodiment of a rotatably coupled actuator system comprising a dynamically varying weight as biased against the screen.

FIG. 3E is yet another embodiment of an actuator support structure in which a dynamically variable and/or varying mass and/or force 313 is applied to dynamically vary the bias of the actuator against the screen. Variable mass and/or force 313 may be supplied by a variable spring force, variable weights, piezo structures and/or any other suitable mass and/or force known. Such variable weight and/or force may in addition be applied according to signals supplied by a controller 314. Such controller may receive input signals from one or more possible sensors—e.g., a photo sensor 316a and/or a force sensor 316b. Photo sensor 316a may be a camera and/or some image capture/detection device that is sensing/regarding the image on the screen and detecting the amount of (or any change in) the speckle displayed on the screen. If the photo sensor sends signals that the controller may interpret that a change (e.g., either more or less) in bias of the actuator against the screen may improve the speckle reduction, then the controller may send signals to the variable weight/force 313 to apply the desired change in bias.

In the case of the force detector 316b, these detectors may be piezo force sensors, embedded in or associated with the actuator (or any other known means of detecting contact force and/or bias that is in mechanical communication with the screen) that send signals to the controller 314 in order to change bias of the variable weight and/or force as desired.

In another embodiment, a method for correcting for artifacts and/or adjusting image projection includes the steps of illuminating a screen with a test image, identifying at least one shaker induced artifact, and adjusting at least one shaker parameter to reduce at least one shaker induced artifact. The at least one parameter comprises, for example, one of a frequency of the shaker, a shape of the shaker, a motion induced by the shaker, a pressure of the shaker (e.g., pressure against or placement of the shaker adjacent to the screen), a pendulum balance of the shaker, a contact area of the shaker, a modulation of the shaker, an angle of the shaker, a mechanical adjustment of an assembly holding the shaker, an adjustment changing a proximate position of the shaker relative to the screen. The at least one shaker induced artifact may comprise, for example, a speckle pattern associated with a contact area (or "contact" area) of the shaker. The step of adjusting may comprise, for example, activating a remote control. The adjusting may comprise manual placement of weights on a lever that, upon movement, brings a shaker back into equilibrium adjacent and in "contact" with the screen (contact without significant pressure).

The step of activating the remote control may comprise identifying at least one of a plurality of shakers and sending a control signal to the identified shaker(s). The step of adjusting may comprise, activating a remote control for a group or plurality of shakers adjacent to the screen. The identified shakers comprise a set of shakers within a plurality of shakers, and the control signal is configured to adjust each of the identified shakers in a similar way.

The step of adjusting may comprise, for example, adjusting a moment of inertia of mechanical device configured to place the shaker at a location directly adjacent to a non-viewing side of the screen. The mechanical device may comprise, for example, a weighted swing-arm. The step of adjusting may comprise moving the weight with respect to the swing-arm. The mechanical device may comprise a movable extension attached to the weight and wherein the adjustment comprises increasing or decreasing an amount of leverage the weight applies through the extension to an arm of the mechanical device by extending or retracting the movable extension. Extending or retracting the movable extension, or other types adjustment discussed elsewhere herein, may be electrically activated, and may be activated by remote control. Adjusting the moment of inertia may comprise adding weight to the swing arm or other components as described elsewhere herein to which the shaker is attached.

The step of adjusting may comprise, for example, adjusting the shaker such that a screen coupler attached to the shaker is directly adjacent and parallel to the screen. The adjusted shaker may be, in various embodiments, for example, in contact with the screen but balanced such that it does not exert pressure on the screen. The adjusted shaker is, for example, as close as possible to the screen for maximum speckle reduction with a minimum of test image artifacts induced by the shaker and coupler.

The adjusted shaker may be, for example, in contact with the screen and balanced such that it exerts enough pressure on the screen to maintain contact with the screen, but not enough pressure to induce pressure/contact related artifacts in images displayed on the screen.

The adjusted shaker coupler may be, for example, in contact with the screen and balanced such that it exerts enough pressure on the screen to remain in contact and adjacent to the screen without causing a protrusion of the screen.

The method may place the shaker such that the contact and adjacency of the shaker coupler remains (moves back to equilibrium) in light of screen movement due to any one or combination of air conditioning or ventilating systems, air currents to entrance and/or exit door openings, or other movements normally associated with a viewing screen during use, including motion induced by theme park ride cars, explosions, heat induced motion, fans, or motion of props when said screen is installed at a theme park ride.

The shaker comprises, for example, a base shaking device, a coupler attached to the base shaking device, and a placement device attached to the base shaking device, the method further comprising the step of maintaining a face of the coupler parallel and adjacent to the screen.

In another embodiment, a reduced speckle laser projection system may comprise, for example, a screen installed at a venue, a laser projection system configured to project images onto the screen, and a plurality of screen shakers disposed on a non-viewing side of the screen. Each screen shaker may be, for example, movably held in position via a corresponding placement device configured to place the screen shaker directly adjacent to the screen with an amount of pressure that does not substantially change when the screen moves. The amount of pressure is, for example, mostly negligible, which is, for example, an amount of pressure does not cause any viewable surface variation on a viewing side of the screen. The surface variations on a viewing side of the screen from one or more of mechanical, acoustical, or vibrational forces of the shaker. The shaker is configured to cause surface variations comprising motion in a plane of the screen caused by the shaker. The surface variations on a viewing side of the screen are, for example, caused by one or more of mechanical, acoustical, or vibrational forces of the shaker and not by a pressure of the shaker on the screen.

The placement device may comprise, for example, a dual arm dual-pivot swing (as discussed in various embodiments further herein) that maintains a coupler of the shaking device parallel to the screen. In one embodiment, the placement device comprises a dual arm dual-pivot swing that maintains a coupler of the shaking device parallel to the screen while moving due to screen movement. The placement device may comprise, for example, parallelism mechanism configured to maintain a coupler of the shaker parallel to the screen while moving due to screen movement. The placement device may comprise a coupler motion parallel placement mechanism configured to maintain a coupler of the shaker parallel where it would otherwise not be parallel due to shaker induced movement.

The placement device may comprise, for example, a coupler motion parallel placement mechanism configured to maintain a coupler of the shaker parallel where it would otherwise not be parallel due to shaker induced movement.

Another Embodiment

Figure 4A:
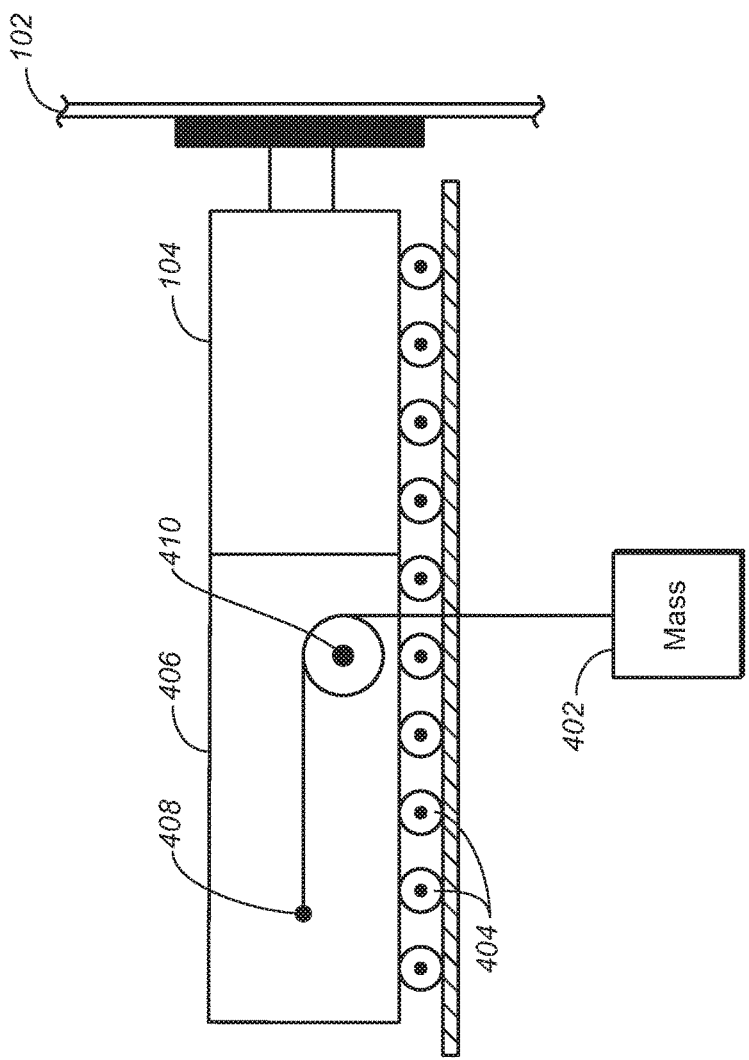
FIGS. 4A and 4B depict two alternative embodiments of a linear coupled actuator system.

FIG. 4A is yet another embodiment of an actuator support structure 300. In this embodiment, instead of being rotatably coupled, the actuators may be linearly coupled (or otherwise in desired mechanical communication) to the screen by a set of linear bearings 404 that may be mounted in a housing movably resting on the bearings. In FIG. 4, the actuator may be attached to a housing 406—and some bias structure or means may be applied to maintain a desired mechanical communication of the actuator to the screen. One bias may comprise a pulley 410 and a mass 402. In this embodiment, the force on the screen is proportional to the mass. In this embodiment, it may be noted that the force is substantially constant over the full range of motion of the linear bearing, as follows:

$$F=m*g$$

Figure 4B:
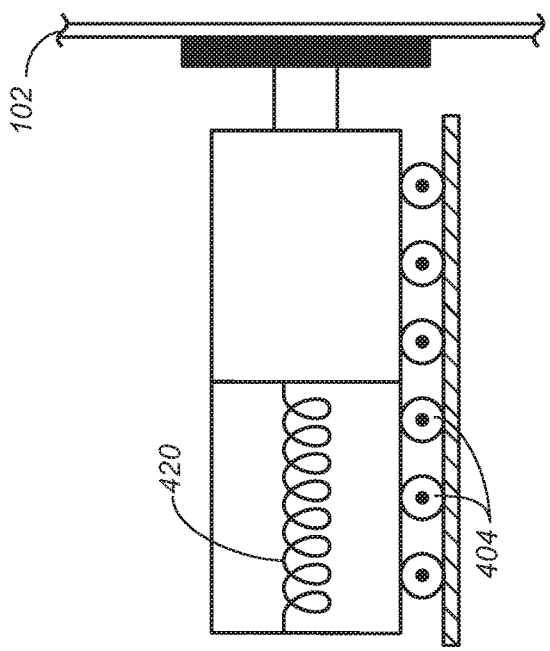

FIG. 4B is another linearly coupled actuator to the screen. In this embodiment, instead of a weight and pulley, the actuator may be biased to the screen by a spring 420 that has a suitable biasing force to maintain appropriate contact with the screen. In one embodiment, it may be possible to adjust the tension on the spring such that the proper mechanical communication between the actuator and the screen is substantially zero force and that any deviation from that zero provides a counter-balancing force to restore that zero. In another embodiment, a spring may be placed such that, for the necessary range of motion, its force may tend to be maintained within an acceptable upper and lower bound. Such a spring may be not unlike a pendulum that only "swings" at the bottom of its arc. As such, this spring would only operate in a range where the force (while not constant) is substantially unchanged. In one embodiment, the actuator may be affixed to the screen in any manner known, including adhesive, glue, tape, Velcro, magnetic stripes or the like.

Magnetic Field Coupling and/or Modulation

In some embodiments, it may be desirable to employ systems, methods and/or techniques in order to maintain the proper coupling and/or bias of the actuator to the screen. In one embodiment, it may be possible to employ magnetic field coupling (e.g., whether static or varying) in order to maintain the proper coupling.

Figure 5:
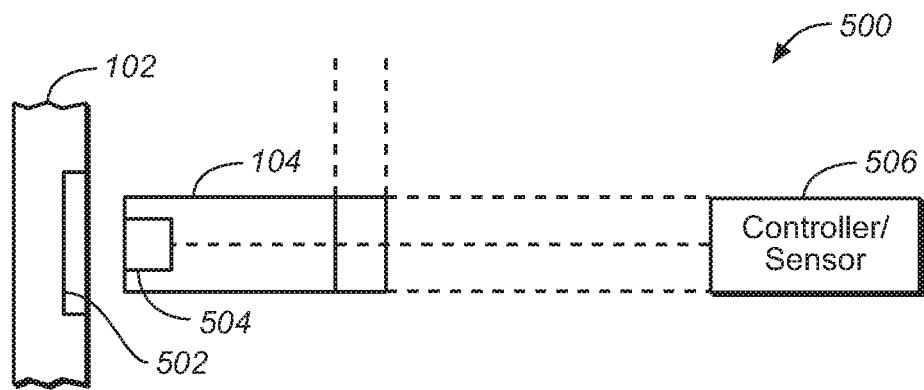
FIG. 5 depicts one embodiment of a magnetically coupled actuator system.

FIG. 5 is one embodiment of such a magnetic coupling system as made in accordance with the principles of the present application. Actuator 104 may further comprise an actuator magnetic element 504. Actuator magnetic element 504 may be either a permanent magnet or a varying electromagnetic element. If magnetic element 504 is a varying electromagnet (e.g., a solenoid or the like), then there may be an optional controller 506 in order to vary the magnetic field desirably. In addition, 506 may comprise optional sensors that may detect any number of parameter that may be useful in the governing of the coupling and/or bias of the actuator to the screen. Suitable sensors might include (but are not limited to): position sensors, motion sensors, accelerometers or the like.

On the screen 102, there may be place a screen magnetic element 502—which may be either permanent (e.g. magnetic bar, magnetic strip or the like) or varying electromagnet (e.g., with any suitable controller and/or sensors, not shown).

In one case, the system may be designed or built to detect the amount of force, or relative positions, of the actuator to the screen. If the system employs some varying magnetic field, then the system may be designed with the sensors providing proper feedback on position, force, velocity, and/or acceleration in order to maintain desired coupling.

It will be appreciated that the dashed lines in FIG. 5 denote that the magnetic coupling schemes as mentioned above may be employed in either the rotatably coupled systems and/or the linearly coupled systems.

Other Embodiments

Figure 6:
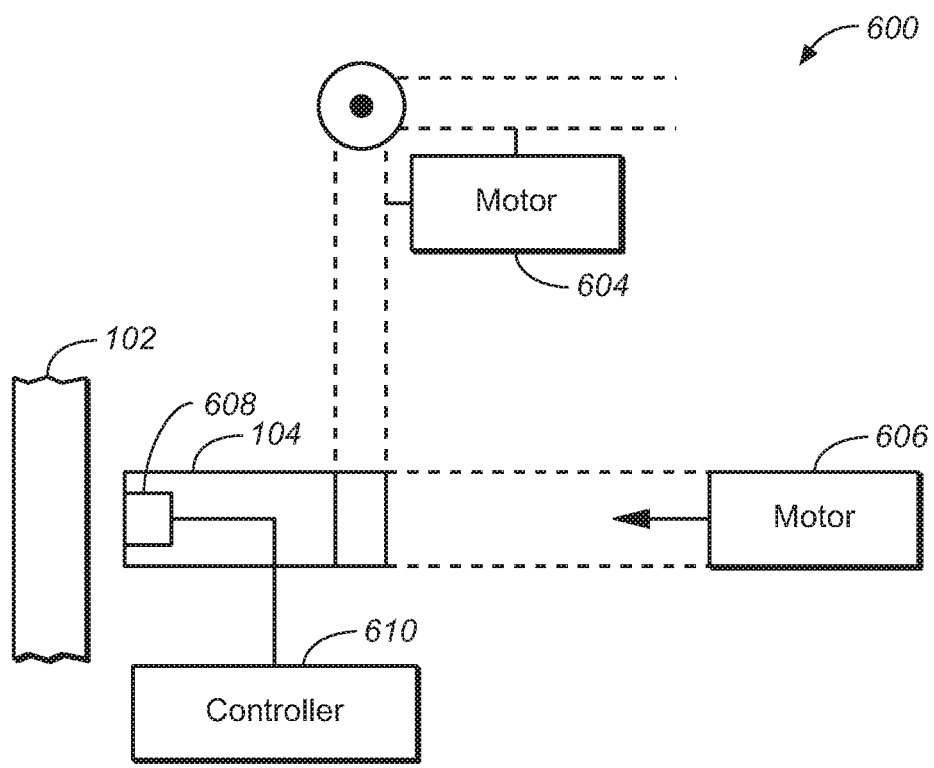
FIG. 6 depicts one embodiment of a servo-motor coupled actuator system.
Figure 7A:
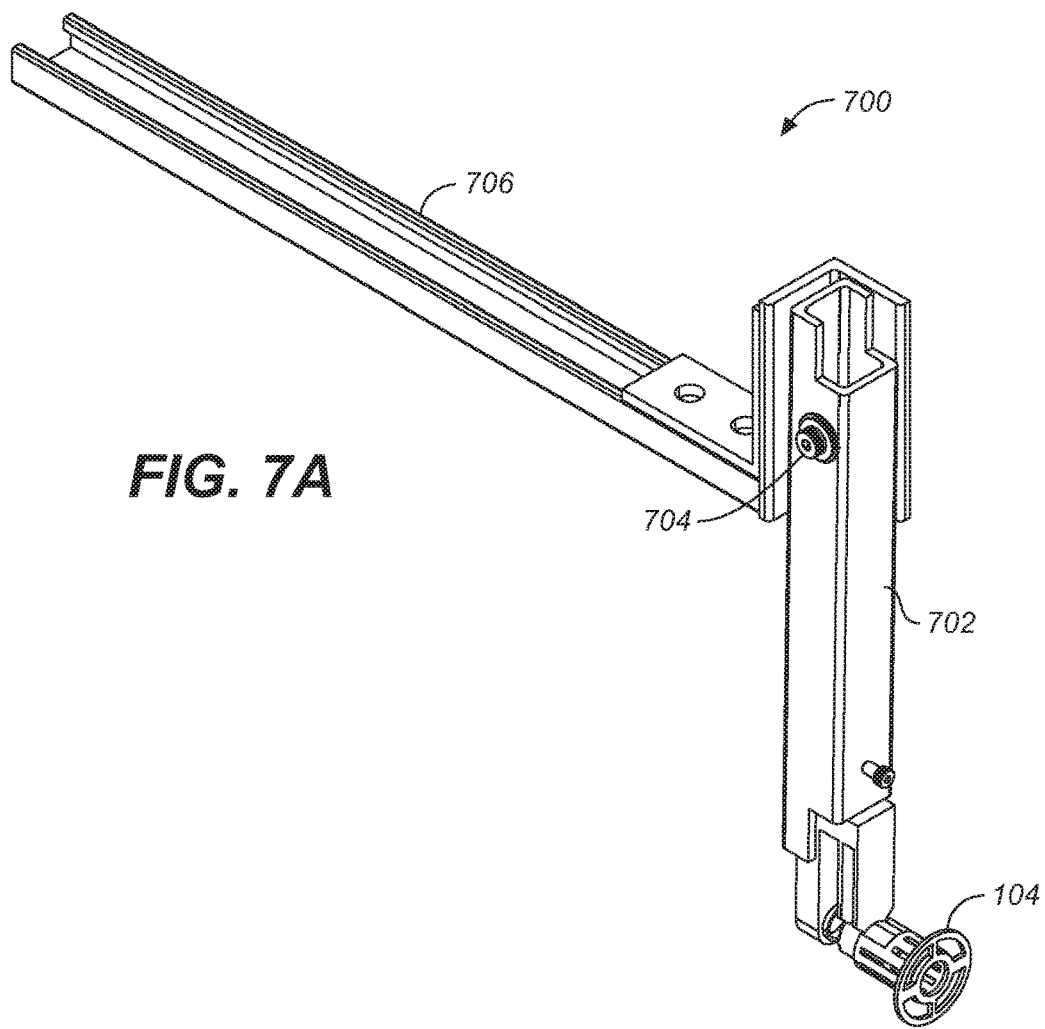
Figure 7B:
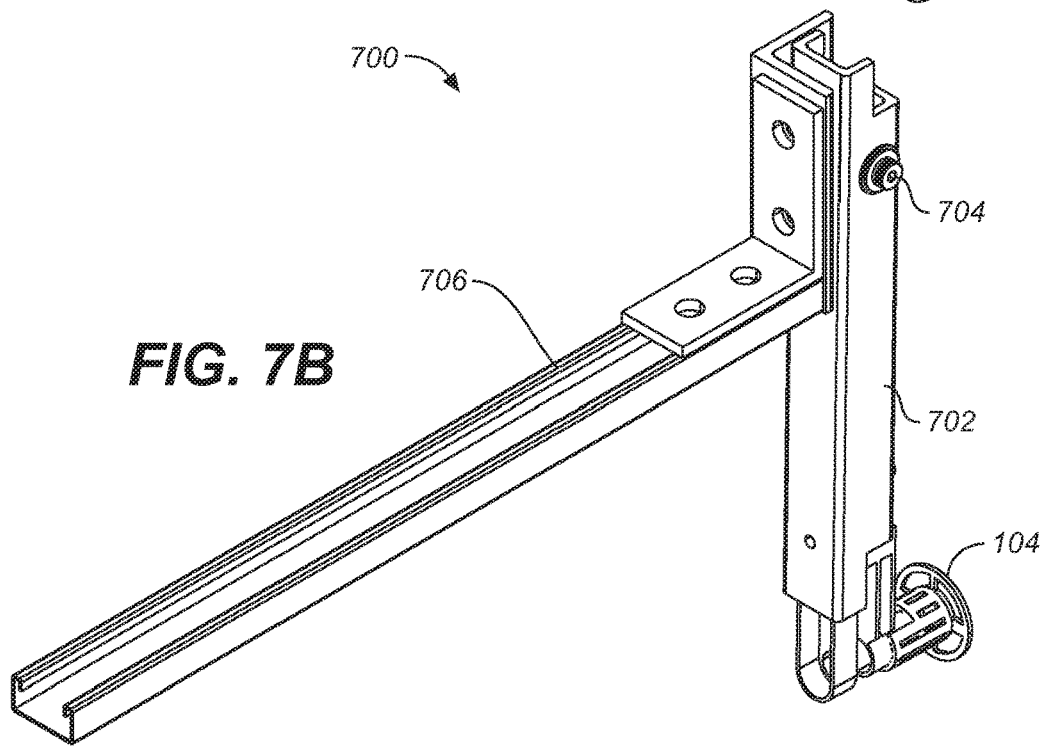
Figure 8A:
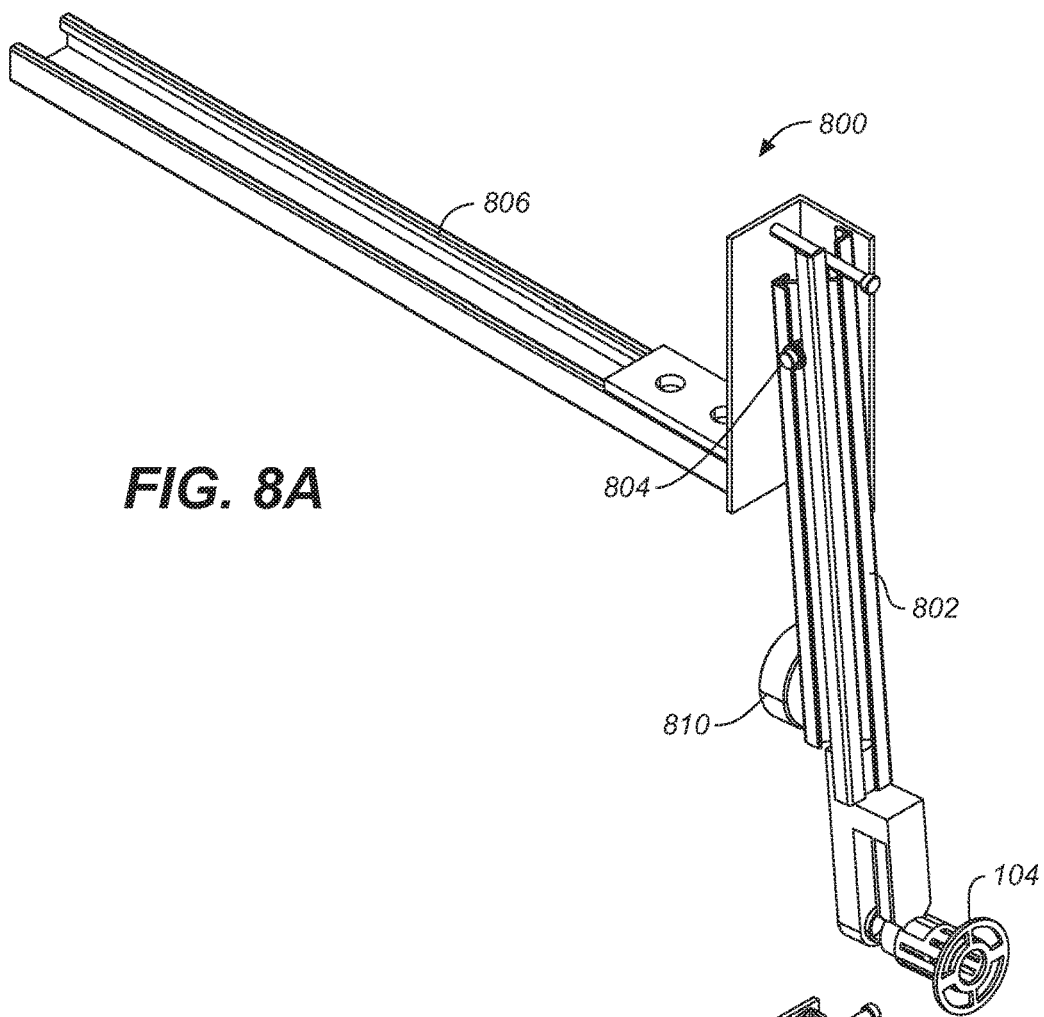
Figure 8B:
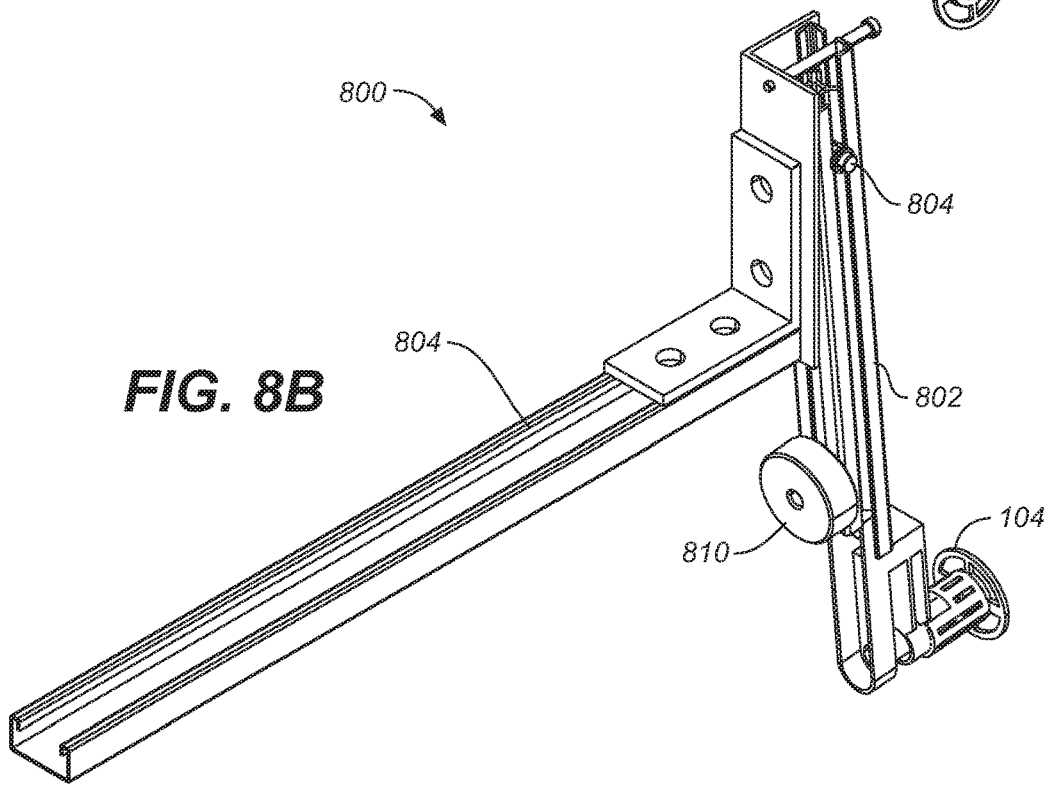

FIG. 6 is yet another embodiment of an actuator coupled to screen system that further comprises at least one servo-motor (e.g. 604, if actuator is rotatably coupled; 606, if actuator is linearly coupled). In addition, there may be at least one sensor 608 that may detect some characteristic (e.g., the position, speed and/or acceleration of the actuator in relation to the screen) of the mechanical communication of the actuator in relation to the screen. Signals from these optional sensor(s) may be input into controller 610 that may, in turn, control servo-motors (e.g., 604 or 606) to provide the desired bias to the actuators in relation to the screen.

Particular Pendulum Embodiments

FIGS. 7A through 7H are a set of various perspective drawings of one pendulum embodiment (700). As may be seen, actuator 104 is mounted and/or affixed to first support member 702—which is rotatably mounted to second support member 706 via a pivot 704.

FIGS. 8A through 8H are a set of various perspective drawings of another pendulum embodiment (800). As may be seen, actuator 104 is mounted and/or affixed to first support member 802—which is rotatably mounted to second support member 806 via a pivot 804. An additional mass 810 is mounted on the first support member 802, as shown.

Embodiments with Counterweight

Figure 9A:
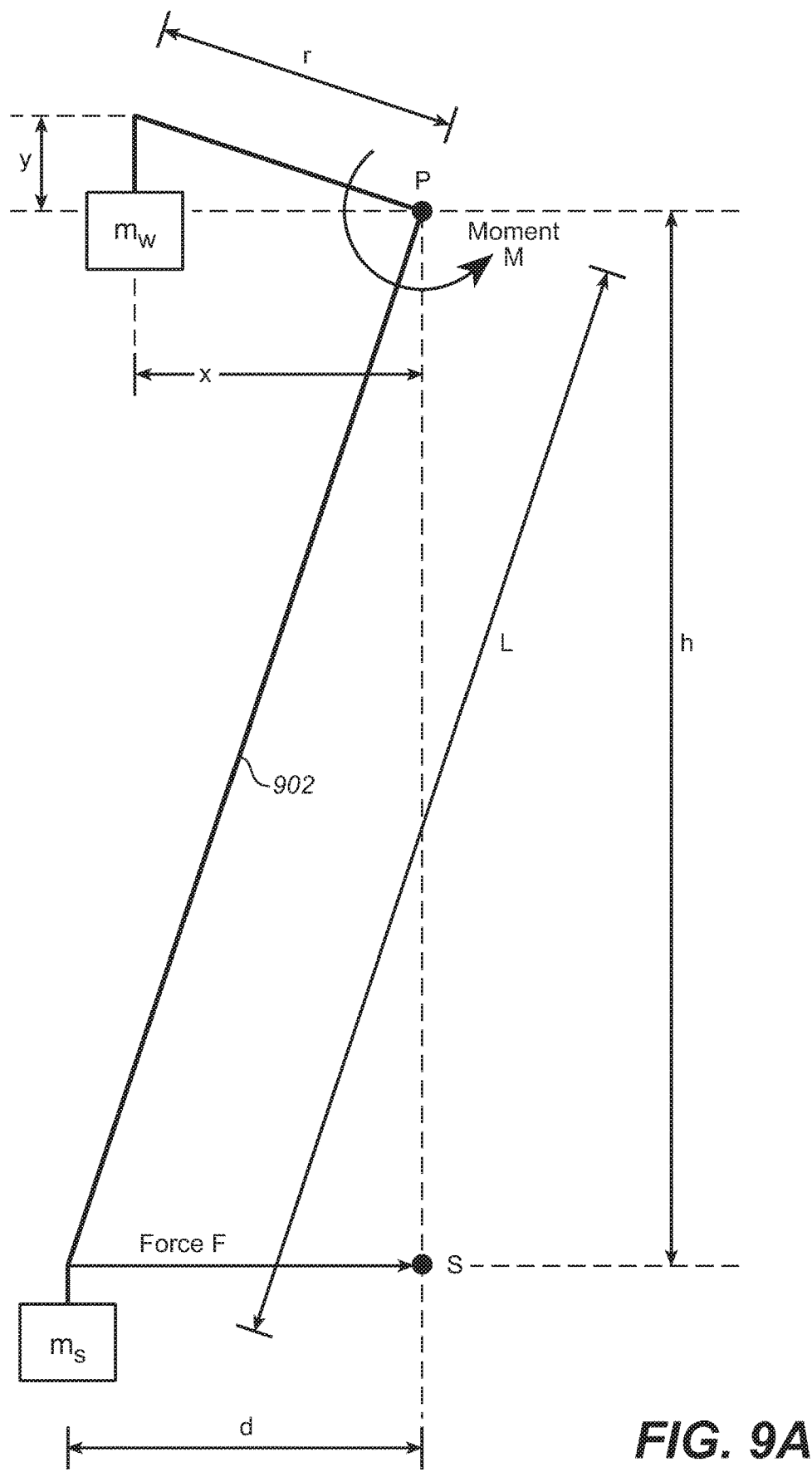
FIG. 9A shows an analysis of several embodiments of pendulum screen shakers described herein.

FIG. 9A shows an analysis of several embodiments of pendulum screen shakers given above. As may be seen, pendulum screen shaker 902 of length 'l' is pivoted about point 'P' applying a force 'F' against the screen at point 'S'. $m_s$ represents the mass of the voicecoil and washers at bottom of pendulum. $m_w$ represents a mass hung from an arm of length 'r' attached to the screen shaker at the pivot, perpendicular to the pendulum.

This analysis looks for the variation in force 'F' vs the displacement of the bottom of the pendulum 'd'. The moment ($M_{mw}$) due to mw is given by:

$$M_{m_w} = m_w \cdot g \cdot x$$
$$y = d*(r/l)$$
$$x^2 + y^2 = r^2$$
$$x^2 + d^2*(r/l)^2 = r^2$$
$$x^2 = r^2 * \left(1 - \left(\frac{d}{l}\right)^2\right)$$
$$x = r * \sqrt{\left(1 - \left(\frac{d}{l}\right)^2\right)}$$

Substituting for x above, we have:

$$M_{mw} = m_w * g * r * \sqrt{\left(1 - \left(\frac{d}{l}\right)^2\right)}$$

The moment due to $m_s$ is given by:

$$M_{ms} = m_s * g * d$$

The horizontal force F at S is given by:

$$F = M/h$$

Where $$h^2 + d^2 = l^2$$
$$h = l * \sqrt{\left(1 - \left(\frac{d}{l}\right)^2\right)}$$

Substituting for h above, we have:

$$F = M \bigg/ \left(l * \sqrt{\left(1 - \left(\frac{d}{l}\right)^2\right)}\right)$$

Substituting for M, we have $$F = (M_{mw} + M_{ms}) \bigg/ \left(l * \sqrt{\left(1 - \left(\frac{d}{l}\right)^2\right)}\right)$$

$$F = \left(\left(m_w * g * r * \sqrt{1 - \left(\frac{d}{l}\right)^2}\right) + (m_s * g * d)\right) \bigg/ \left(l * \sqrt{\left(1 - \left(\frac{d}{l}\right)^2\right)}\right)$$

Assuming that d<<l, we have $$F \approx m_w * g * \left(\frac{r}{l}\right) + m_s * g * \left(\frac{d}{l}\right)$$

So, in the final analysis of some of the aforementioned embodiments, the force due to $m_w$ is approximately independent of d. In addition, the force due to $m_s$ is proportional to d.

To improve the performance of pendulum screen shakers, it may be desirable to have a force that is independent of the displacement d. As the force due to the mass on the end of the pendulum is proportional to the displacement, it may be desirable to minimize this effect. In one embodiment, it may be noted that a mass on an arm attached to the screen shaker at the pivot, perpendicular to the pendulum, tends to cause a force that is approximately independent of displacement.

As it is noticed that even a very small force against the screen may cause a visually undesirable dimple, it may be desirable to minimize this effect. As the voicecoil assembly and the pendulum have some mass, there tends to be some force proportional to the displacement. Thus, in one embodiment that may tend to solve this, it may be possible to extend the pendulum above the pivot and add a counterweight so that the center of mass of the pendulum (e.g., not including the arm and mass $M_w$) is at the pivot.

Figure 9B:
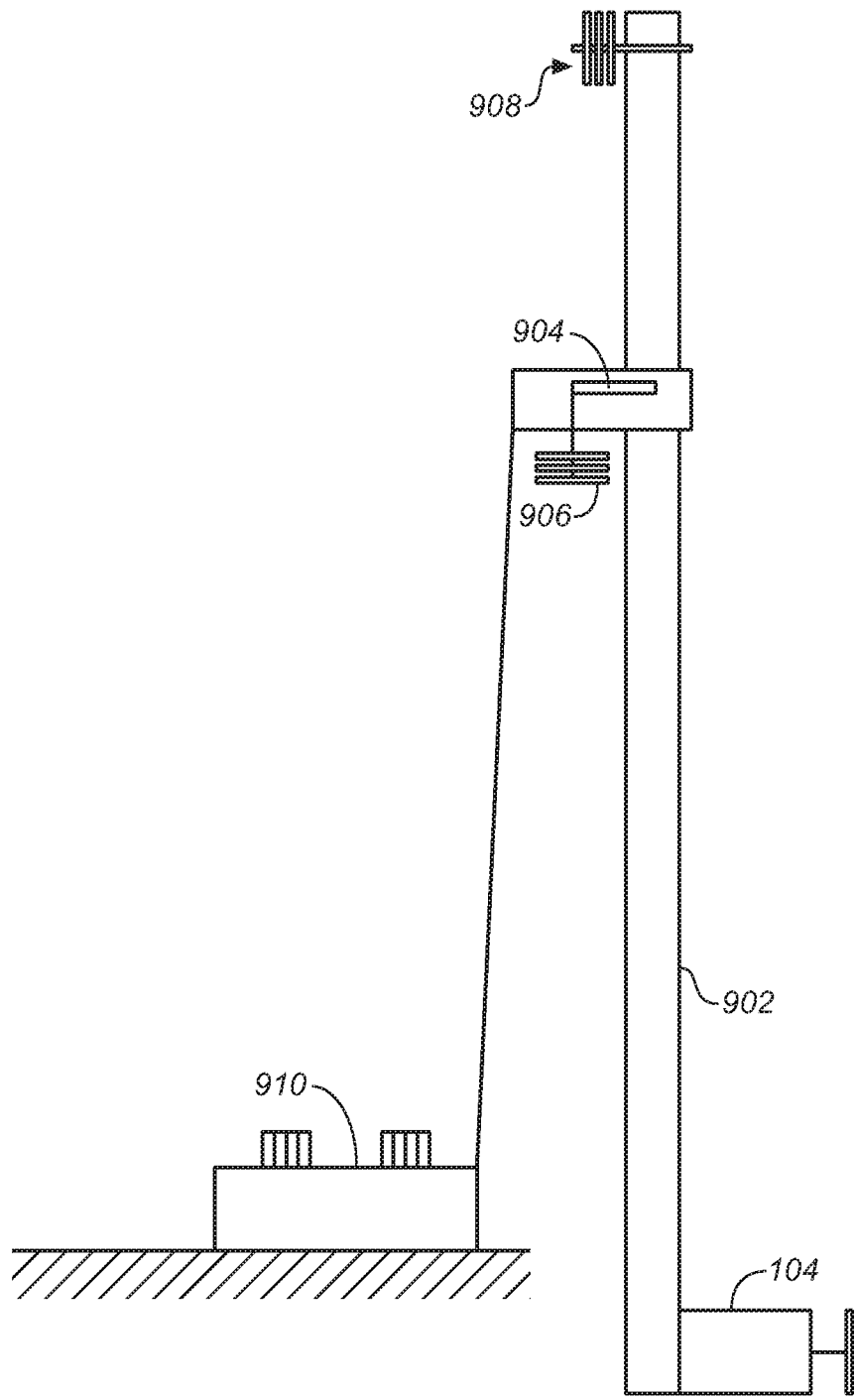
FIG. 9B depicts one such embodiment of a pendulum screen shaker comprising such a counterweight.
Figure 10A:
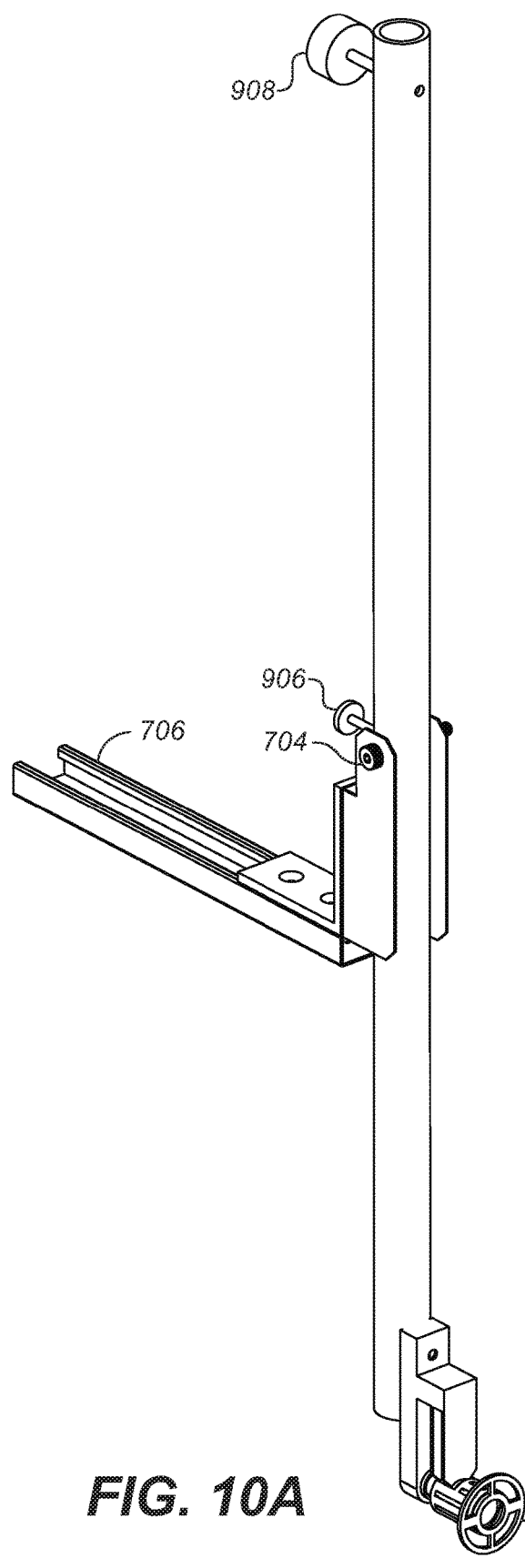
FIGS. 10A through 10B depict several different views of one particular embodiment of a pendulum screen shaker comprising a counterweight.
Figure 10B:
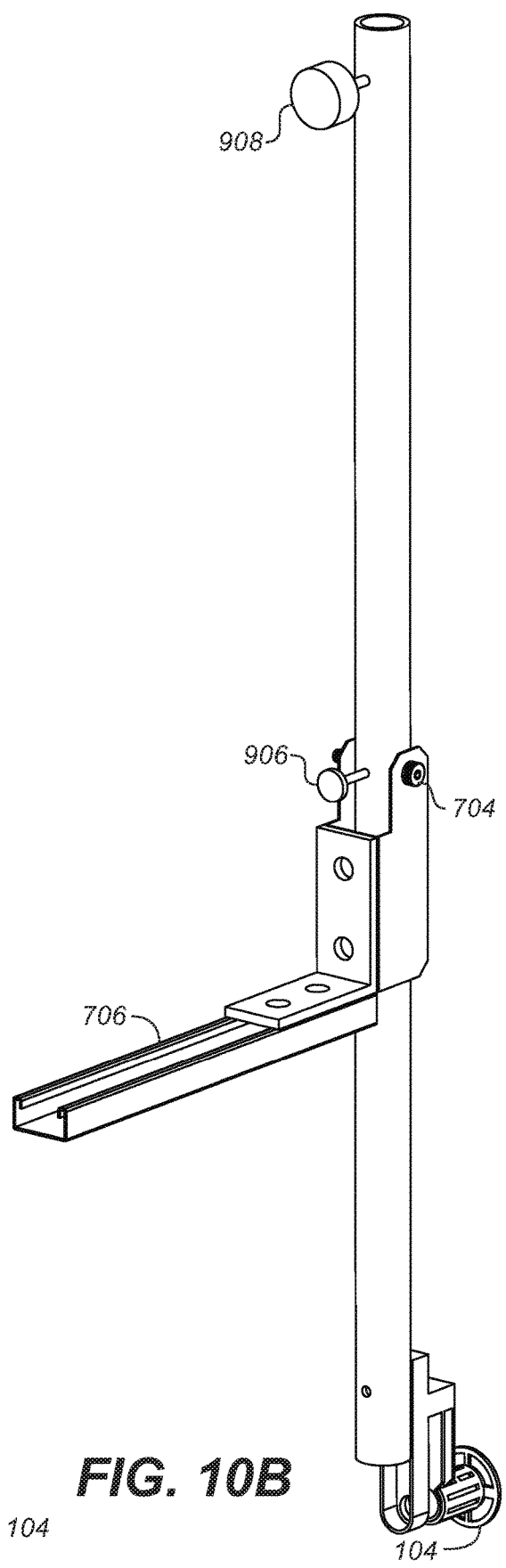

FIG. 9B depicts one such embodiment of a pendulum screen shaker 902 comprising such a counterweight. As seen, shaker 902 comprises voicecoil 104 (e.g. without any added weight) and positioned below the pivot (e.g. distal from the pivot). An adjustment weight 906 is attached at the end of arm 904 at or near the pivot of the pendulum. Counterweight 908 is shown as attached above (e.g., proximal from) the pivot of the pendulum. Shaker may be given mechanical and electrical attachment at 910. It will be appreciated that many different designs are possible of a pendulum screen shaker with counterweight and that the scope of the present application encompasses all such embodiments. In another embodiment, a counterweight may be added to the shaker on the distal side of the mount and the actuator is affixed on the proximal side of the mount. Other design variations are possible and are encompassed by the scope of the present application.

FIGS. 10A through 10B and FIGS. 11A through 11C depict several different views of one particular embodiment of a pendulum screen shaker comprising a counterweight. FIGS. 12A and 12B depict one embodiment of a pendulum screen shaker comprising a counterweight at rest and with relative motion between positions 1202, 1204 and 1206.

Other Embodiments

Figure 13:
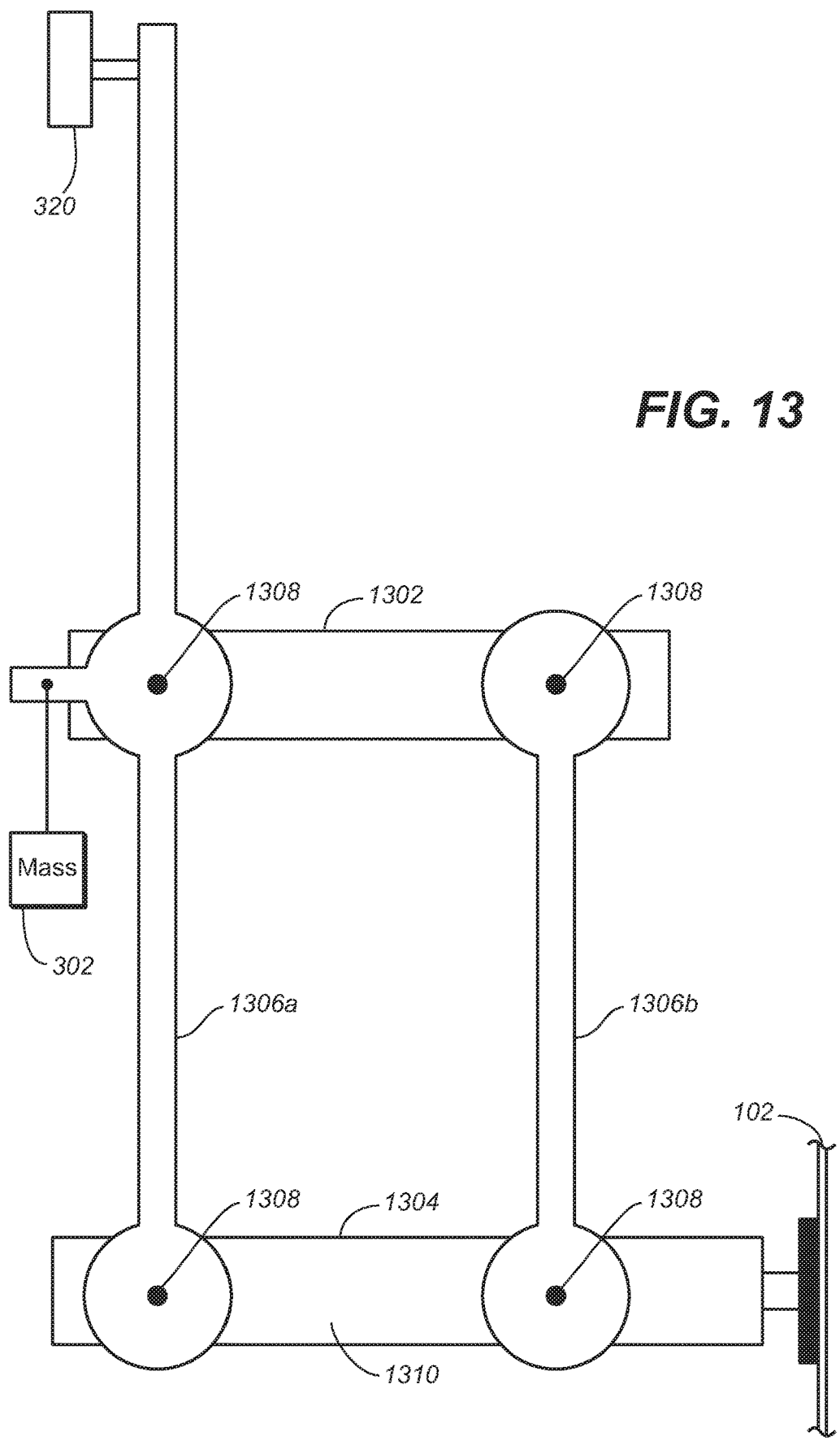
FIG. 13 depicts an embodiment of a dual-linkage pendulum screen shaker.

FIG. 13 is yet another embodiment of a dual linkage screen shaker comprising a fixed support member 1302 attached at the structure at pivots 1308—which are also in mechanical communication with members 1306a and 1306b. Members 1306a and 1306b are in mechanical communications with swinging horizontal member 1310 (at other pivots 1308, as shown). As may be seen, an actuator may be coupled at the end of the swinging horizontal member, which in turn may bring the actuator into mechanical communication with the screen.

This dual-linkage mount and/or structure (as depicted in FIG. 13) may tend to prevent rotation of actuator 102 as the screen moves. Although, in some embodiments, a long pendulum (i.e., l>>d) may reduce this rotation, this dual-linkage mount/structure may tend to allow no rotation and would tend to eliminate any asymmetrical imprint of the actuator in the screen.

As mentioned above, the placement structure may comprise, for example, a dual arm dual-pivot swing that maintains a coupler of the shaking device parallel to the screen. In one embodiment, the placement device comprises a dual arm dual-pivot swing that maintains a coupler of the shaking device parallel to the screen while moving due to screen movement. The placement device may comprise, for example, parallelism mechanism configured to maintain a coupler of the shaker parallel to the screen while moving due to screen movement. The placement device may comprise a coupler motion parallel placement mechanism configured to maintain a coupler of the shaker parallel where it would otherwise not be parallel due to shaker induced movement.

Figure 14:
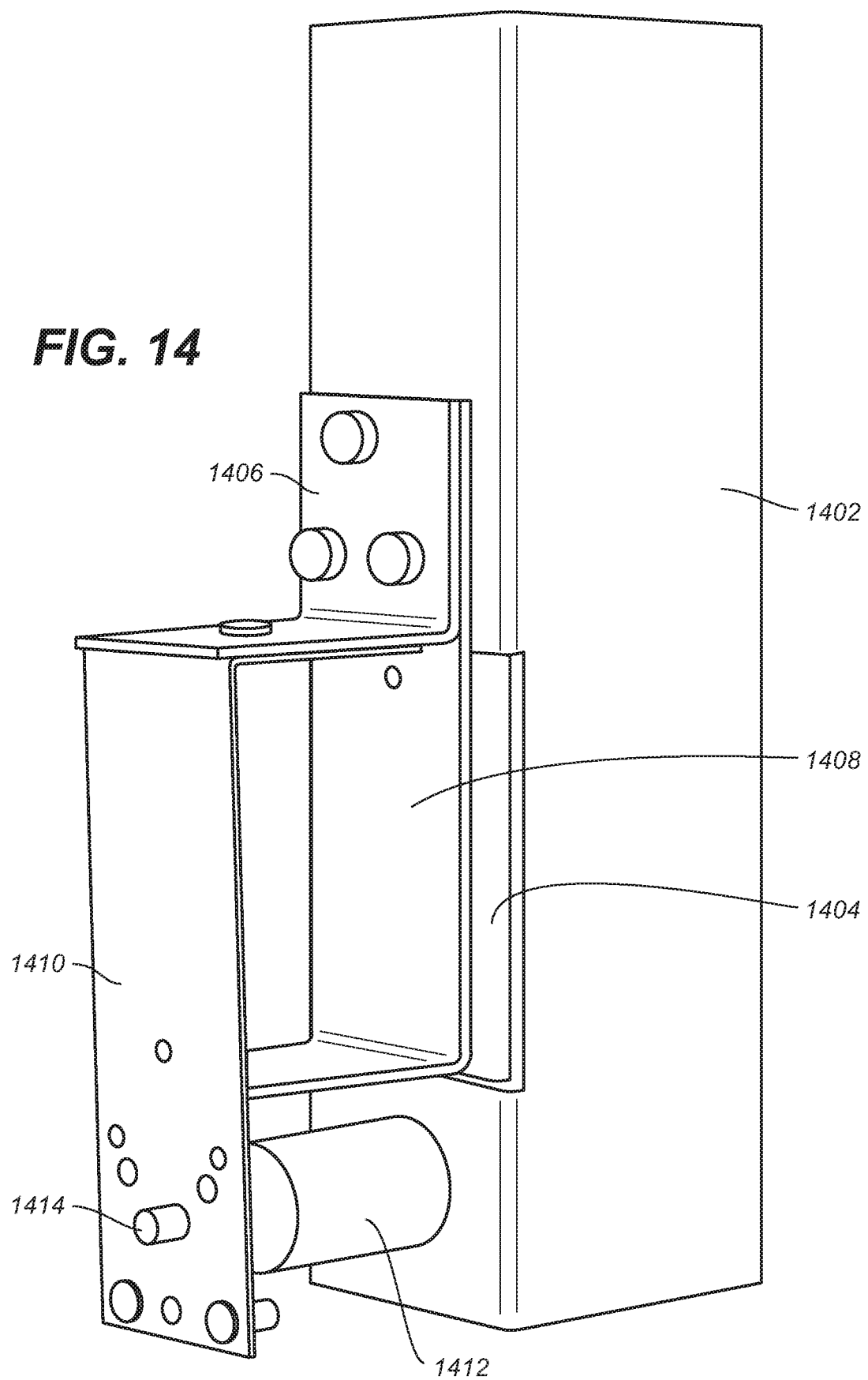
FIG. 14 depicts an embodiment of a diving board voice-coil mount on a screen shaker.

FIG. 14 is one embodiment of voice coil mount in the manner of a diving board and/or cantilevered section. Member 1402 may have attached/affixed (or in some manner mechanically mated) a diving board (or cantilevered member) 1410 at 1406. This attachment as shown is bolted—but, it should be appreciated that the mechanical mating may be accomplished by any known manner. An optional second member 1408 may be provided for added stability (and a window and/or void section 1404 may be cut out from member 1402 to allow for movement). Voicecoil 1412 may be attached to the diving board section 1410—and by which the actuator (not shown) may be attached at portion 1414.

As shown, voicecoil 1412 may be mounted with a parallel linkage to prevent rotation of the actuator/voicecoil over the range of travel and/or vibration. In one embodiment, the placement structure may comprise, for example, a parallelogram shaped device maintains a position of the shaker parallel to the screen during motion of the screen due to air currents or other disturbances and a parallelogram that maintains a face of the shaker parallel to the screen despite motion of the face due to shaker vibrations. The parallelogram shaped device may be mounted, for example on an arm having a cut-away ("window") that allows the parallelogram shaped device to vibrate freely. Alternatively a device the functions as a parallelogram, maintaining the shaker or its transducer/coupler element parallel to the screen and mounted such that it can vibrate freely.

In yet another embodiment, a more cost-effective solution may be to construct the "diving board" as a single cantilever mount (e.g., where the optional second member 1408 is not provided). In this case, the rotation of the actuator/voicecoil may be reduced by extending the length of the cantilever section.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A method comprising the steps of:
   illuminating a screen with a test image;
   identifying at least one shaker induced artifact; and
   adjusting at least one shaker parameter to reduce at least one shaker induced artifact;
   wherein the step of adjusting comprises adjusting a moment of inertia of mechanical device configured to place the shaker at a location directly adjacent to a non-viewing side of the screen.

2. The method according to claim 1, wherein the at least one parameter comprises one of a frequency of the shaker, a shape of the shaker, a motion induced by the shaker, a pressure of the shaker, a pendulum balance of the shaker, a contact area of the shaker, a modulation of the shaker, an angle of the shaker, a mechanical adjustment of an assembly holding the shaker, an adjustment changing a proximate position of the shaker relative to the screen.

3. The method according to claim 1, wherein the at least one shaker induced artifact comprises a speckle pattern associated with a contact area of the shaker.

4. The method according to claim 1, wherein the step of adjusting comprises activating a remote control.

5. The method according to claim 4, wherein the step of activating the remote control comprises identifying at least one of a plurality of shakers and sending a control signal to the identified shaker(s).

6. The method according to claim 5, wherein the identified shakers comprise a set of shakers within a plurality of shakers, and the control signal is configured to adjust each of the identified shakers in a similar way.

7. The method according to claim 1, wherein the mechanical device comprises a weighted swing-arm and the step of adjusting comprises moving the weight with respect to the swing-arm.

8. The method according to claim 1, wherein the mechanical device comprises a movable extension attached to the weight and wherein the adjustment comprises increasing or decreasing an amount of leverage the weight applies through the extension to an arm of the mechanical device by extending or retracting the movable extension.

9. The method according to claim 8, wherein extending or retracting the movable extension is electrically activated.

10. The method according to claim 1, wherein adjusting the moment of inertia comprises adding weight.

11. The method according to claim 1, wherein the step of adjusting comprises adjusting the shaker such that a screen coupler attached to the shaker is directly adjacent and parallel to the screen.

12. The method according to claim 11, wherein the adjusted shaker is in contact with the screen but balanced such that it does not exert pressure on the screen.

13. The method according to claim 11, wherein the adjusted shaker is as close as possible to the screen for maximum speckle reduction with a minimum of test image artifacts induced by the shaker and coupler.

14. The method according to claim 11, wherein the adjusted shaker is in contact with the screen and balanced such that it exerts enough pressure on the screen to maintain contact with the screen.

15. The method according to claim 11, wherein the adjusted shaker coupler is in contact with the screen and balanced such that it exerts enough pressure on the screen to remain in contact and adjacent to the screen without causing a protrusion of the screen.

16. The method according to claim 15, wherein the contact and adjacency of the shaker coupler remains in light of screen movement due to any one or combination of air conditioning or ventilating systems, air currents to entrance and/or exit door openings, or other movements normally associated with a viewing screen during use.

17. The method according to claim 16, wherein the other movements normally associated with a viewing screen during use include motion induced by theme park ride cars, explosions, heat induced motion, fans, and motion of props when said screen is installed at a theme park ride.

18. The method according to claim 1, wherein the shaker comprises a base shaking device, a coupler attached to the base shaking device, and a placement device attached to the base shaking device, the method further comprising the step of maintaining a face of the coupler parallel and adjacent to the screen.

* * * * *